(12) United States Patent
Gaal et al.

(10) Patent No.: US 8,442,001 B2
(45) Date of Patent: May 14, 2013

(54) SYSTEMS, METHODS AND APPARATUS FOR FACILITATING HANDOVER CONTROL USING RESOURCE RESERVATION WITH FREQUENCY REUSE

(75) Inventors: Peter Gaal, San Diego, CA (US); Rajat Prakash, La Jolla, CA (US); Parag A. Agashe, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 727 days.

(21) Appl. No.: 12/603,400

(22) Filed: Oct. 21, 2009

(65) Prior Publication Data

US 2011/0092209 A1 Apr. 21, 2011

(51) Int. Cl.
*H04Q 7/00* (2006.01)
(52) U.S. Cl.
USPC .......................................................... 370/330
(58) Field of Classification Search .................. 370/330; 455/561
See application file for complete search history.

(56) References Cited

U.S. PATENT DOCUMENTS

| 7,227,850 | B2 * | 6/2007 | Dahlman et al. ............... 370/330 |
| 2002/0145988 | A1 | 10/2002 | Dahlman et al. |
| 2004/0203815 | A1 | 10/2004 | Shoemake et al. |
| 2005/0143123 | A1 | 6/2005 | Black et al. |
| 2006/0268772 | A1 | 11/2006 | Ko et al. |

FOREIGN PATENT DOCUMENTS

| EP | 1143754 A1 | 10/2001 |
| EP | 1549093 | 6/2005 |
| EP | 1641187 A1 | 3/2006 |
| EP | 1744577 | 1/2007 |
| WO | WO2006129174 | 12/2006 |

OTHER PUBLICATIONS

International Search Report and Written Opinion—PCT/US2009/068846, International Search Authority—European Patent Office—Aug. 18, 2010.
Mischa Schwartz: "Mobile wireless communication" Dec. 31, 2005, Press syndicate of the university of Cambridge , Cambridge, United Kingdom , XP002595455 ISBN: 0521843472 , pp. 62-80.
Taehoon Kwon, et al., "A Power Division Reuse Partitioning Scheme with Half Frequency Reuse Factor for OFDMA Downlink Systems" Communications. ICC '08. IEEE International Conference on, IEEE, Piscataway, NJ, USA, May 19, 2008 , pp. 3237-3241, XP031535103 ISBN: 978-1-4244-2075-9.

* cited by examiner

*Primary Examiner* — William D Cumming
(74) *Attorney, Agent, or Firm* — Florin Corie

(57) ABSTRACT

Systems, methods and apparatus for facilitating handover control using resource reservation with frequency reuse are provided. In one embodiment, the method can include: transmitting scheduling information for the transmission of information on frequencies corresponding to an unreserved portion of a frequency band. The method can also include transmitting scheduling information for the transmission of information on frequencies corresponding to a reserved portion of the frequency band. A frequency reuse scheme can be employed over the frequencies corresponding to the reserved portion of the frequency band, and the information transmitted on the frequencies corresponding to the reserved portion of the frequency band can be handover signalling information.

29 Claims, 21 Drawing Sheets

007
SYSTEMS, METHODS AND APPARATUS FOR FACILITATING HANDOVER CONTROL USING RESOURCE RESERVATION WITH FREQUENCY REUSE

BACKGROUND

I. Field

The following description relates to wireless communications, in general, and to facilitating handover control in wireless communication systems, in particular.

II. Background

Wireless communication systems are widely deployed to provide various types of communication. For instance, voice and/or data can be provided via such wireless communication systems. A typical wireless communication system, or network, can provide multiple users access to one or more shared resources (e.g., bandwidth, transmit power). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple-access communication systems can simultaneously support communication for multiple user equipments (UEs). Each UE can communicate with one or more base stations (BSs) via transmissions on forward and reverse links. The forward link (or downlink (DL)) refers to the communication link from BSs to UEs, and the reverse link (or uplink (UL)) refers to the communication link from UEs to BSs. This communication link can be established via a single-in-single-out, multiple-in-single-out or a multiple-in-multiple-out (MIMO) system.

MIMO systems commonly employ multiple ($N_T$) transmit antennas and multiple ($N_R$) receive antennas for data transmission. A MIMO channel formed by the $N_T$ transmit and $N_R$ receive antennas can be decomposed into $N_S$ independent channels, which can be referred to as spatial channels, where $N_S \leq \{N_T, N_R\}$. Each of the $N_S$ independent channels corresponds to a dimension. Moreover, MIMO systems can provide improved performance (e.g., increased spectral efficiency, higher throughput and/or greater reliability) if the additional dimensionalities created by the multiple transmit and receive antennas are utilized.

MIMO systems can support various duplexing techniques to divide forward and reverse link communications over a common physical medium. For instance, frequency division duplex (FDD) systems can utilize disparate frequency regions for forward and reverse link communications. Further, in time division duplex (TDD) systems, forward and reverse link communications can employ a common frequency region so that the reciprocity principle allows estimation of the forward link channel from reverse link channel.

Wireless communication systems oftentimes employ one or more BSs to provide a coverage area. A typical BS can transmit multiple data streams for broadcast, multicast and/or unicast services, wherein a data stream may be a stream of data that can be of independent reception interest to a UE. A UE within the coverage area of such BS can be employed to receive one, more than one, or all the data streams carried by the composite stream. Likewise, a UE can transmit data to the BS or to another UE. In some embodiments, as with OFDM systems, wherein BSs transmit over a frequency, frequency reuse can be employed to assign different frequencies to neighboring BSs to reduce the interference experienced by the UE due to the concurrent transmissions of the neighboring BSs.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating handover control using resource reservation with frequency reuse in wireless communication systems.

According to related aspects, a method is provided. The method can include transmitting scheduling information for transmission of first information on one or more frequencies. The one or more frequencies can correspond to an unreserved portion of a frequency band. The method can also include transmitting scheduling information for transmission of second information on one or more frequencies corresponding to a reserved portion of the frequency band. A frequency reuse scheme can be employed over the one or more frequencies corresponding to the reserved portion of the frequency band.

Accordingly to other related aspects, a computer program product is provided. The computer program product can include a computer-readable medium. The computer-readable medium can include a first set of codes for causing a computer to transmit scheduling information for transmission of first information on one or more frequencies corresponding to an unreserved portion of a frequency band. The computer-readable medium can also include a second set of codes for causing the computer to transmit scheduling information for transmission of second information on one or more frequencies corresponding to a first reserved portion of the frequency band. A frequency reuse scheme can be employed over the one or more frequencies corresponding to the first reserved portion of the frequency band.

According to still other aspects, an apparatus is provided. The apparatus can include a receiver configured to receive frequency reuse information indicative of a first reserved portion of a frequency band assigned to the apparatus according to a frequency reuse scheme, and to receive information indicative of a quality of a channel experienced at a user equipment. The apparatus can also include a control unit. The control unit can include a channel quality unit configured to determine the quality of the channel experienced at the user equipment. The control unit can also include a scheduling unit configured to schedule communication of first information on the first reserved portion of the frequency band in response to the quality of the channel at the user equipment being less than a selected level. The first information can be signalling information. The apparatus can also include a transmitter configured to transmit, to the user equipment, resource allocation information indicative of scheduled communication; and a memory configured to store the frequency reuse information.

According to yet other aspects, another apparatus is provided. The apparatus can include means for receiving frequency reuse information indicative of a first reserved portion of a frequency band assigned to the apparatus according to a frequency reuse scheme; and means for receiving information indicative of a quality of a channel experienced at a means for communicating. The apparatus can also include means for determining the quality of the channel experienced at the means for communicating; and means for scheduling communication of first information on the first reserved portion of a frequency band in response to the quality of the channel at the means for communicating being less than a selected level, wherein the first information is signalling information. The apparatus can also include means for transmitting, to the means for communicating, resource allocation information indicative of a scheduled communication; and means for storing frequency reuse information indicative of the frequency reuse scheme.

According to still other aspects, another method is provided. The method can include: receiving, at a user equipment, scheduling information indicative of one or more frequencies corresponding to a common portion of a frequency band, and indicative of a type of first information for communication over the one or more frequencies corresponding to the common portion of the frequency band. The method can also include receiving, at the user equipment, scheduling information indicative of one or more reserved frequencies corresponding to a first reserved portion of the frequency band, and indicative of a type of second information for communication over the one or more reserved frequencies. The one or more reserved frequencies can be assigned to a first base station of a plurality of base stations according to a frequency reuse scheme employed over the one or more reserved frequencies.

According to yet other aspects, another computer program product is provided. The computer program product can include a computer-readable medium including a first set of code for causing a computer to receive, at a user equipment, scheduling information indicative of one or more frequencies corresponding to a common portion of a frequency band, and indicative of a type of first information for communication over the one or more frequencies corresponding to the common portion of the frequency band. The computer-readable medium can also include a second set of codes for causing the computer to receive, at the user equipment, scheduling information indicative of one or more reserved frequencies corresponding to a first reserved portion of the frequency band, and indicative of a type of second information for communication over the one or more reserved frequencies. The one or more reserved frequencies can be assigned to a first base station of a plurality of base stations according to a frequency reuse scheme employed over the one or more reserved frequencies.

According to other aspects, an apparatus is provided. The apparatus can include a control unit. The control unit can include: a measurement unit configured to measure a quality of a channel experienced at the apparatus; and a scheduling unit configured to schedule transmission and reception of information on a reserved portion of frequency or an unreserved portion of frequency. The control unit can also include a user equipment data and signalling information generator configured to generate data or signalling information for transmission on the reserved portion of frequency or the unreserved portion of frequency. The apparatus can also include: a transmitter configured to transmit, to a base station serving the apparatus, information indicative of the quality of the channel experienced at the apparatus; and a receiver configured to receive, from the base station serving the apparatus, resource allocation information. The resource allocation information can include: scheduling information for causing the transmitter to transmit the data or the signalling information on the reserved portion of frequency or on the unreserved portion of frequency; and scheduling information for causing the scheduling unit to schedule the transmission and the reception of information on the reserved portion of frequency or on the unreserved portion of frequency. The apparatus can also include a memory configured to store the scheduling information.

According to still other embodiments, an apparatus is provided. The apparatus can include: means for measuring a quality of a channel experienced at the apparatus; means for scheduling transmission and reception of information on a reserved portion of frequency or an unreserved portion of frequency; and means for generating data and signalling information to generate data or signalling information for transmission on the reserved portion of frequency or the unreserved portion of frequency. The apparatus can also include: means for transmitting, to a means for controlling communication serving the apparatus, information indicative of the quality of the channel experienced at the apparatus; and means for receiving resource allocation information, from the means for controlling communication serving the apparatus. The resource allocation information can include: scheduling information for causing the means for transmitting to transmit the data or the signalling information on the reserved portion of frequency or on the unreserved portion of frequency; and scheduling information for causing the means for scheduling to schedule the transmission and the reception of information on the reserved portion of frequency or on the unreserved portion of frequency. The apparatus can also include means for storing the scheduling information.

According to yet other aspects, an apparatus is provided. The apparatus can include: means for measuring a quality of a channel experienced at the apparatus; means for scheduling transmission and reception of information on a reserved portion of frequency or an unreserved portion of frequency; and means for generating data and signalling information to generate data or signalling information for transmission on the reserved portion of frequency or the unreserved portion of frequency. The apparatus can also include: means for transmitting, to a means for controlling communication serving the apparatus, information indicative of the quality of the channel experienced at the apparatus. The apparatus can also include: means for receiving resource allocation information, from the means for controlling communication serving the apparatus. The resource allocation information can include: scheduling information for causing the means for transmitting to transmit the data or the signalling information on the reserved portion of frequency or on the unreserved portion of frequency; and scheduling information for causing the means for scheduling to schedule the transmission and the reception of information on the reserved portion of frequency or on the unreserved portion of frequency. The apparatus can also include means for storing the scheduling information.

According to still other aspects, another method is provided. The method can include receiving information indicative of a frequency reuse scheme to be employed over a reserved portion of a frequency band assigned to a first base station of a plurality of base stations. The reserved portion of the frequency band can be a fraction of a frequency spectrum, and the fraction of the frequency spectrum can be determined based on a signalling traffic load for the first base station of the plurality of base stations and a position of the first base station of the plurality of base stations relative to a second base station of the plurality of base stations. The method can also include transmitting signalling information over the reserved portion of the frequency band.

According to yet other aspects, another computer program product is provided. The computer program product can include a computer-readable medium comprising: a first set of codes for causing a computer to receive information indicative of a frequency reuse scheme to be employed over a reserved portion of a frequency band assigned to a first base station of a plurality of base stations. The reserved portion of the frequency band can be a fraction of a frequency spectrum, and the fraction of the frequency spectrum can be determined based on a signalling traffic load for the first base station of the plurality of base stations and a position of the first base station of the plurality of base stations relative to a second base station of the plurality of base stations. The computer-readable medium can also include a second set of codes for causing the computer to transmit signalling information over the reserved portion of the frequency band.

In yet other embodiments, another apparatus is provided. The apparatus can include a receiver configured to receive information indicative of a frequency reuse scheme to be employed over a reserved portion of a frequency band assigned to a first base station of a plurality of base stations. The reserved portion of the frequency band can be a fraction of a frequency spectrum. The fraction of the frequency spectrum can be determined based on a signalling traffic load for the first base station of the plurality of base stations and a position of the first base station of the plurality of base stations relative to a second base station of the plurality of base stations. The apparatus can also include a transmitter configured to transmit signalling information over the reserved portion of the frequency band.

In still other embodiments, another apparatus is provided. The apparatus can include means for receiving information indicative of a frequency reuse scheme to be employed over a reserved portion of a frequency band assigned to a first base station of a plurality of base stations. The reserved portion of the frequency band can be a fraction of a frequency spectrum. The fraction of the frequency spectrum can be determined based on a signalling traffic load for the first base station of the plurality of base stations and a position of the first base station of the plurality of base stations relative to a second base station of the plurality of base stations. The apparatus can also include means for transmitting signalling information over the reserved portion of the frequency band.

According to other aspects, another method is provided. The method can include: identifying a pair of base stations in a wireless communication system, the pair of base stations comprising a first base station and a second base station; determining if the first base station and the second base station are neighboring base stations; and assigning the first base station and the second base station to a same reserved subset of frequencies. The method can also include, in response to the first base station and the second base station being neighboring base stations, assigning full power transmission to the first base station and reduced power transmission to the second base station.

According to still other aspects, another computer program product is provided. The computer program product includes a computer-readable medium including: a first set of codes for causing a computer to identify a pair of base stations in a wireless communication system, the pair of base stations comprising a first base station and a second base station; a second set of codes for causing the computer to determine if the first base station and the second base station are neighboring base stations; and code for assigning the first base station and the second base station to a same reserved subset of frequencies. The computer-readable medium can also include a third set of codes for causing the computer to, in response to the first base station and the second base station being neighboring base stations, assign full power transmission to the first base station and reduced power transmission to the second base station.

In yet another embodiment, another apparatus is provided. The apparatus can include a processor configured to identify a pair of base stations in a wireless communication system. The pair of base stations can include a first base station and a second base station. The processor can also be configured to determine if the first base station and the second base station are neighboring base stations; assign the first base station and the second base station to a same reserved subset of frequencies; and in response to the first base station and the second base station being neighboring base stations, assign full power transmission to the first base station and reduced power transmission to the second base station.

In still another embodiment, yet another apparatus is provided. The apparatus can include a processing means configured to identify a pair of base stations in a wireless communication system. The pair of base stations can include a first base station and a second base station. The processor can also be configured to: determine if the first base station and the second base station are neighboring base stations; assign the first base station and the second base station to a same reserved subset of frequencies; and in response to the first base station and the second base station being neighboring base stations, assign full power transmission to the first base station and reduced power transmission to the second base station.

According to other aspects, another method is provided. The method can include: identifying a pair of base stations in a wireless communication system, the pair of base stations comprising a first base station and a second base station; determining if the first base station and the second base station are neighboring base stations; and assigning the first base station and the second base station to a same reserved subset of frequencies. The method can also include, in response to the first base station and the second base station being neighboring base stations, assigning a first power level to the first base station and a second power level to the second base station. The first power level and the second power level can be different and can be assigned for concurrent transmissions from the first base station and the second base station.

According to still other aspects, another computer program product is provided. The computer program product includes a computer-readable medium including: a first set of codes for causing a computer to identify a pair of base stations in a wireless communication system, the pair of base stations comprising a first base station and a second base station; a second set of codes for causing the computer to determine if the first base station and the second base station are neighboring base stations; and a third set of codes for causing the computer to assign the first base station and the second base station to a same reserved subset of frequencies. The computer-readable medium can also include a fourth set of codes for causing the computer to, in response to the first base station and the second base station being neighboring base stations, assign a first power level to the first base station and a second power level to the second base station. The first power level and the second power level can be different and can be assigned for concurrent transmissions from the first base station and the second base station.

According to other aspects, an apparatus is provided. The apparatus can include a processor configured to identify a pair of base stations in a wireless communication system. The pair of base stations can include a first base station and a second base station. The processor can also be configured to: determine if the first base station and the second base station are neighboring base stations; assign the first base station and the second base station to a same reserved subset of frequencies; and in response to the first base station and the second base station being neighboring base stations, assign a first power level to the first base station and a second power level to the second base station, the first power level and the second power level being different and being assigned for concurrent transmissions from the first base station and the second base station.

According to still other aspects, another apparatus is provided. The apparatus can include a processing means configured to identify a pair of base stations in a wireless communication system. The pair of base stations can include a first base station and a second base station. The processing means can also be configured to: determine if the first base station and the second base station are neighboring base stations; assign the first base station and the second base station to a same reserved subset of frequencies; and in response to the first base station and the second base station being neighboring base stations, assign a first power level to the first base station and a second power level to the second base station, the first power level and the second power level being different and being assigned for concurrent transmissions from the first base station and the second base station.

According to other aspects, another method is provided. The method can include: identifying a pair of base stations in a wireless communication system, the pair of base stations comprising a first base station and a second base station; determining if the first base station and the second base station are neighboring base stations; and, in response to the first base station and the second base station being neighboring base stations, assigning the first base station to a first reserved subset of frequencies, and assigning the second base station to a second reserved subset of frequencies. The method can also include, in response to the first base station and the second base station not being neighboring base stations, assigning the first base station and the second base station to a same reserved subset of frequencies.

According to still other aspects, another computer program product is provided. The computer program product includes a computer-readable medium including: a first set of codes for causing a computer to identify a pair of base stations in a wireless communication system, the pair of base stations comprising a first base station and a second base station; a second set of codes for causing the computer to determine if the first base station and the second base station are neighboring base stations; and a third set of codes for causing the computer to, in response to the first base station and the second base station being neighboring base stations, assign the first base station to a first reserved subset of frequencies, and assigning the second base station to a second reserved subset of frequencies. The computer-readable medium can also include a fourth set of codes for causing the computer to, in response to the first base station and the second base station not being neighboring base stations, assign the first base station and the second base station to a same reserved subset of frequencies.

According to still other aspects, another apparatus is provided. The apparatus can include a processor configured to identify a pair of base stations in a wireless communication system. The pair of base stations can include a first base station and a second base station. The processor can also be configured to; determine if the first base station and the second base station are neighboring base stations; in response to the first base station and the second base station being neighboring base stations, assign the first base station to a first reserved subset of frequencies, and assign the second base station to a second reserved subset of frequencies; and in response to the first base station and the second base station not being neighboring base stations, assign the first base station and the second base station to a same reserved subset of frequencies.

According to still other aspects, another apparatus is provided. The apparatus can include processing means configured to identify a pair of base stations in a wireless communication system. The pair of base stations can include a first base station and a second base station. The processing means can also be configured to: determine if the first base station and the second base station are neighboring base stations; in response to the first base station and the second base station being neighboring base stations, assign the first base station to a first reserved subset of frequencies, and assign the second base station to a second reserved subset of frequencies; and in response to the first base station and the second base station not being neighboring base stations, assign the first base station and the second base station to a same reserved subset of frequencies.

According to other aspects, a system is provided. The system can include a central controller, user equipment and a base station. The central controller can be configured to: determine a signalling traffic load in a cell managed by a first base station; and determine a fraction of a frequency spectrum for allocation to the first base station. The determination of the fraction of the frequency spectrum can be made based on the signalling traffic load and a position of the first base station relative to other base stations. The fraction of the frequency spectrum can correspond to a reserved portion of frequency. The central controller can also be configured to: determine a frequency reuse scheme to employ over the reserved portion of frequency; and transmit information indicative of the frequency reuse scheme to the first base station. The user equipment can be configured to: measure channel conditions; and output information indicative of the channel conditions. The base station can be configured to: receive the information indicative of the frequency reuse scheme; receive the information indicative of the channel conditions; and schedule communication for the user equipment on the reserved portion of frequency in response to channel conditions being below a selected level, wherein the scheduled communication is handover signalling communication.

In still other aspects, another system is provided. The system can include a central controlling means configured to: determine a signalling traffic load in a cell managed by a first base station; and determine a fraction of a frequency spectrum for allocation to the first base station, wherein determination of the fraction of the frequency spectrum is made based on the signalling traffic load and a position of the first base station relative to other base stations. The fraction of the frequency spectrum can correspond to a reserved portion of frequency. The central controlling means can also be configured to: determine a frequency reuse scheme to employ over the reserved portion of frequency; and transmit information indicative of the frequency reuse scheme to the first base station. The system can also include user equipment means configured to: measure channel conditions; and output information indicative of channel conditions. The system can also include a base station means configured to: receive the information indicative of the frequency reuse scheme; receive the information indicative of channel conditions; and schedule communication for the user equipment on the reserved portion of frequency in response to the channel conditions being below a selected level, wherein a scheduled communication is handover signalling communication.

In other aspects, a method is provided. The method can include: determining, by a central controller, a signalling traffic load in a cell managed by a first base station; and determining, by the central controller, a fraction of a frequency spectrum for allocation to the first base station. The determination of the fraction of the frequency spectrum can be made based on the signalling traffic load and a position of the first base station relative to other base stations, and the fraction of the frequency spectrum can correspond to a reserved portion of frequency. The method can also include determining, by the central controller, a frequency reuse scheme to employ over the reserved portion of frequency; transmitting, from the central controller, information indicative of the frequency reuse scheme to the first base station; measuring, at the user equipment, channel conditions; and outputting, from the user equipment, information indicative of channel conditions. The method can also include: receiving, at the base station, the information indicative of the frequency reuse scheme; receiving, at the base station, the information indicative of channel conditions; and scheduling, at the base station, communication for the user equipment on the reserved portion of frequency, in response to the channel conditions being below a selected level. The scheduled communication can be handover signalling communication.

In still another aspect, a computer program product is provided. The computer program product can include: a first set of codes for causing a first computer to determine a signalling traffic load in a cell managed by a first base station; and a second set of codes for causing the first computer to determine a fraction of a frequency spectrum for allocation to the first base station. The determination of the fraction of the frequency spectrum can be made based on the signalling traffic load and a position of the first base station relative to other base stations, and the fraction of the frequency spectrum can correspond to a reserved portion of frequency. The computer program product can also include: a third set of codes for causing the first computer to determine a frequency reuse scheme to employ over the reserved portion of frequency; a fourth set of codes for causing the first computer to transmit information indicative of the frequency reuse scheme to the first base station; a fifth set of codes for causing a second computer to measure channel conditions; and a sixth set of codes for causing the second computer to output information indicative of channel conditions. The computer program product can also include: a seventh set of codes for causing a third computer to receive the information indicative of the frequency reuse scheme; an eighth set of codes for causing the third computer to receive the information indicative of channel conditions; and a ninth set of codes for causing the third computer to schedule communication for the second computer on the reserved portion of frequency, in response to the channel conditions being below a selected level. The scheduled communication can be handover signalling communication.

Toward the accomplishment of the foregoing and related ends, the one or more embodiments comprise the features hereinafter fully described and particularly pointed out in the claims. The following description and the annexed drawings set forth herein detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
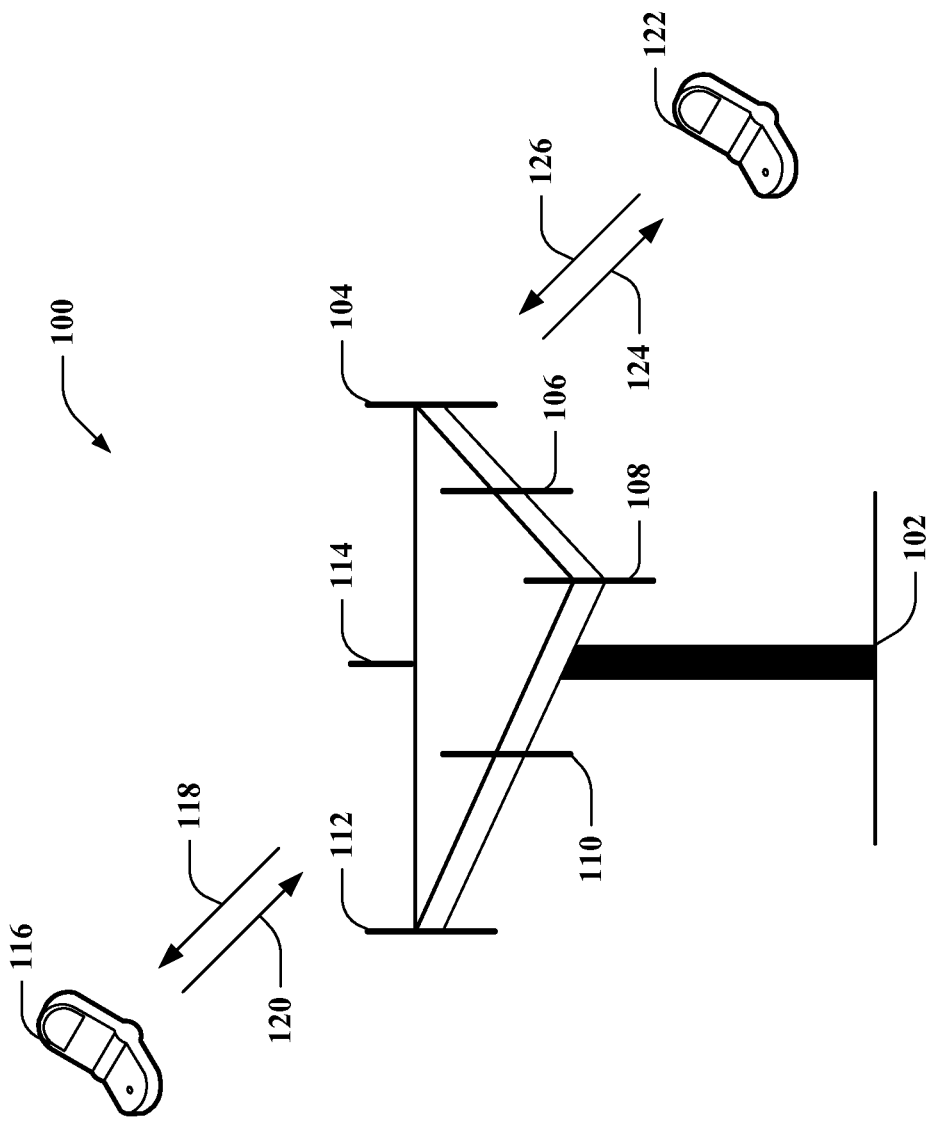
FIG. 1 is an illustration of an example wireless communication system for facilitating handover control using resource reservation with frequency reuse in accordance with aspects described herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiments may be practiced without these specific details. In other instances, well-known structures and devices are shown in block diagram form in order to facilitate describing one or more embodiments.

As used in this application, the terms "component," "module," "unit," "system," and the like are intended to refer to a computer-related entity, either hardware, firmware, a combination of hardware and software, software and/or software in execution. For example, a component can be, but is not limited to being, a process running on a processor, a processor, an object, an executable, a thread of execution, a program, and/or a computer. By way of illustration, both an application running on a computing device and/or the computing device can be a component. One or more components can reside within a process and/or thread of execution and a component can be localized on one computer and/or distributed between two or more computers. In addition, these components can execute from various computer-readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and/or other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. An OFDMA system can implement a radio technology such as Evolved UTRA (E-UTRA), Ultra Mobile Broadband (UMB), IEEE 802.12 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and Global System for Mobile Communications (GSM) are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA) utilizes single carrier modulation and frequency domain equalization. SC-FDMA can have similar performance and essentially the same overall complexity as those of an OFDMA system. A SC-FDMA signal can have lower peak-to-average power ratio (PAPR) because of its inherent single carrier structure. SC-FDMA can be used, for instance, in uplink communications where lower PAPR greatly benefits UEs in terms of transmit power efficiency. Accordingly, SC-FDMA can be implemented as an uplink multiple access scheme in 3GPP Long Term Evolution (LTE) or Evolved UTRA.

Furthermore, various embodiments are described herein in connection with a UE. A UE can also be called a system, subscriber unit, subscriber station, mobile station, mobile, remote station, remote terminal, mobile device, user terminal, terminal, wireless communication device, user agent, user device or access terminal. A UE can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a BS. A BS can be utilized for communicating with UEs and can also be referred to as an access point, Node B, Evolved Node B (eNodeB, eNB) or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include, but are not limited to, magnetic storage devices (e.g., hard disk, floppy disk, magnetic strips), optical disks (e.g., compact disk (CD), digital versatile disk (DVD)), smart cards, and flash memory devices (e.g., EPROM, card, stick, key drive). Additionally, various storage media described herein can represent one or more devices and/or other machine-readable media for storing information. The term "machine-readable medium" can include, without being limited to, wireless channels and various other media capable of storing, containing, and/or carrying codes and/or instruction(s) and/or data.

FIG. 1 is an illustration of an example wireless communication system for facilitating handover control using resource reservation with frequency reuse in accordance with various aspects set forth herein. System 100 can include a BS 102 that can include multiple antenna groups. For example, one antenna group can include antennas 104, 106, another group can comprise antennas 108, 110, and an additional group can include antennas 112, 114. Two antennas are illustrated for each antenna group; however, more or fewer antennas can be utilized for each group. BS 102 can additionally include a transmitter chain and a receiver chain, each of which can in turn comprise a plurality of components associated with signal transmission and reception (e.g., processors, modulators, multiplexers, demodulators, demultiplexers, antennas), as will be appreciated by one skilled in the art.

BS 102 can communicate with one or more UEs such as UE 116, 122. However, it is to be appreciated that BS 102 can communicate with substantially any number of UEs similar to UEs 116, 122. UEs 116, 122 can be, for example, cellular phones, smart phones, laptops, handheld communication devices, handheld computing devices, satellite radios, global positioning systems, PDAs, and/or any other suitable device for communicating over system 100. As depicted, UE 116 is in communication with antennas 112, 114, where antennas 112, 114 transmit information to UE 116 over DL 118 and receive information from UE 116 over an UL 120. Moreover, UE 122 is in communication with antennas 104, 106, where antennas 104, 106 transmit information to UE 122 over a DL 124 and receive information from UE 122 over an UL 126.

Each group of antennas and/or the area in which they are designated to communicate can be referred to as a sector of BS 102. For example, antenna groups can be designed to communicate to UEs in a sector of the areas covered by BS 102. In communication over DLs 118, 124, the transmitting antennas of BS 102 can utilize beamforming to improve signal-to-noise ratio of DLs 118, 124 for UEs 116, 122. Also, while BS 102 utilizes beamforming to transmit to UEs 116, 122 scattered randomly through an associated coverage, UEs 116, 122 in neighboring cells can be subject to less interference as compared to a BS transmitting through a single antenna to all its UEs.

In a time division duplex (TDD) system, DL 118 and UL 120 can utilize a common frequency band and DL 124 and UL 126 can utilize a common frequency band. In a frequency division duplex (FDD) system, DL 118 can utilize a different frequency band than that used by UL 120, and DL 124 can utilize a different frequency band than that employed by UL 126.

Figure 2:
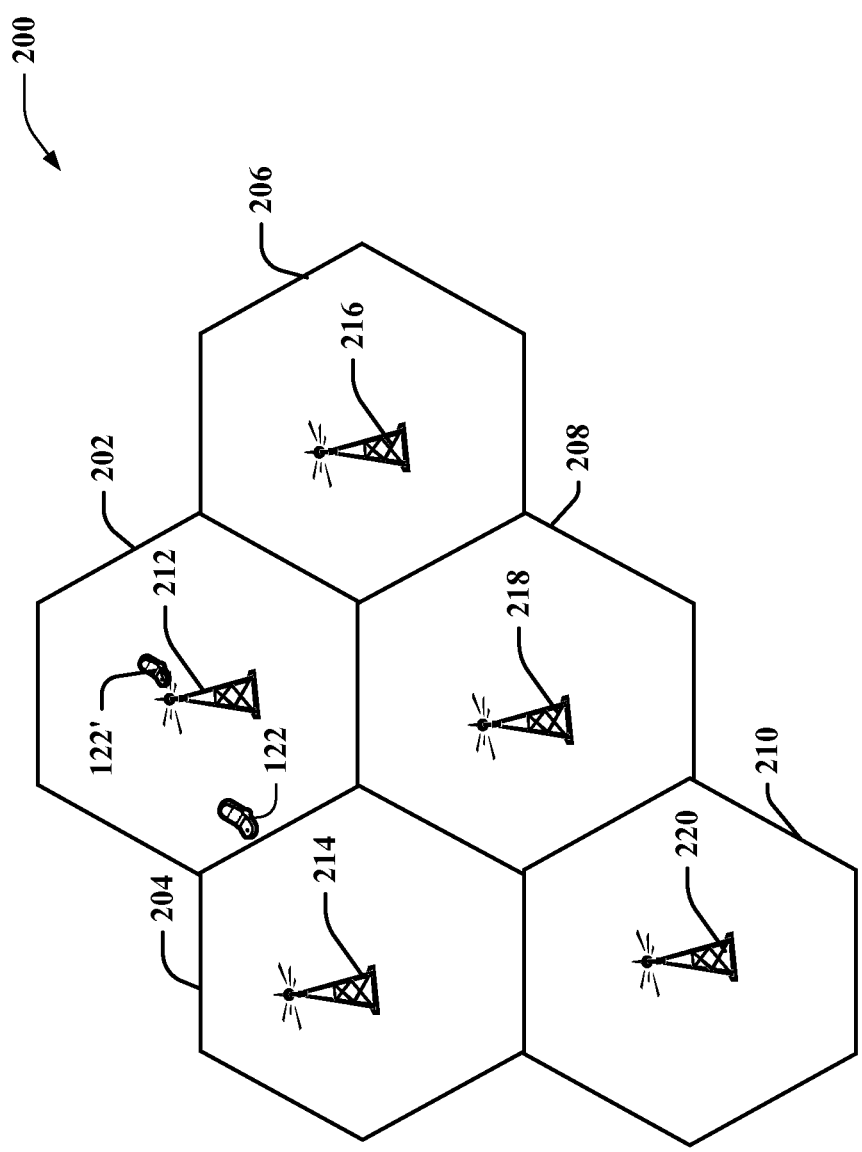
FIG. 2 is an illustration of another example wireless communication for facilitating handover control using resource reservation with frequency reuse in accordance with aspects described herein.

FIG. 2 is an illustration of another example wireless communication for facilitating handover control using resource reservation with frequency reuse in accordance with aspects described herein. The system 200 can be divided into a plurality of cells 202, 204, 206, 208, 210. Each of the plurality of cells 202, 204, 206, 208, 210 can be served by a BS. For example, each of the plurality of cells 202, 204, 206, 208, 210 can be respectively served by BS 212, 214, 216, 218, 220 where each BS 212, 214, 216, 218, 220 can be similar in structure and/or functionality to that described for BS 102 with reference to FIG. 1. While FIG. 2 illustrates each cell size to be approximately equal to the size of each of the other cells, in various embodiments, the cell coverage area can be dictated by the transmit power output from each BS. As described above with reference to FIG. 1, each cell can be further divided into a sector corresponding to an antenna group of the BS.

In the embodiment shown, the BS 212 can be located in the source cell 202, which manages the communication of UEs 122, 122', and BS 214 can be located in the target cell 204 towards which UE 122 is moving and for which handover can be performed. During operation, the UEs 122, 122' can measure the strength of the signal received at the UE from the serving BS 212 of source cell 202, and the strength of the signal received at the UE from the target BS 214 of target cell 204. The UE 122 can transmit to the serving BS 212, a signalling message including information indicative of the strength of the signals received from the serving BS 212 and the target BS 214. In some embodiments, the measurements of the signals can take approximately 600 seconds to 800 seconds. When the strength of the signal received from the target BS 214 is greater than the strength of the signal received from the serving BS 212 by a determined amount, handover signalling information can be transmitted among the serving BS 212, UE 122 and target BS 214 for handover of the UE 122 from the serving BS 212 to the target BS 214.

However, in high mobility environments, the conditions of the channel over which the UE 122 communicates can change very quickly. For example, the signal-to-noise ratio (SNR) of the channel can change drastically based on the position of the UE 122 relative to nearby buildings or other large structures within the source cell 202. Further, in high mobility environments in which the frequency reuse factor is equal to 1, and therefore the serving BS 212 and the target BS 214 communicate over the same frequency band, handover can be further compromised as the interference experienced at the UE 122 can be worsened by the concurrent communications of the serving BS 212 and the target BS 214. Because wireless communication systems generally limit the amount of time for performing handover, poor channel conditions can cause unacceptable delay, call drops or other disruptions to channel connectivity that can cause handover to fail. Accordingly, embodiments of resource reservation using frequency reuse schemes are described herein for facilitating handover. While the embodiments described herein primarily address handover, and correspondingly, handover signalling information, the systems, methods and apparatus described herein can be extended to other functions performed in, and other types of signalling information communicated in, wireless communication systems.

Figure 3:
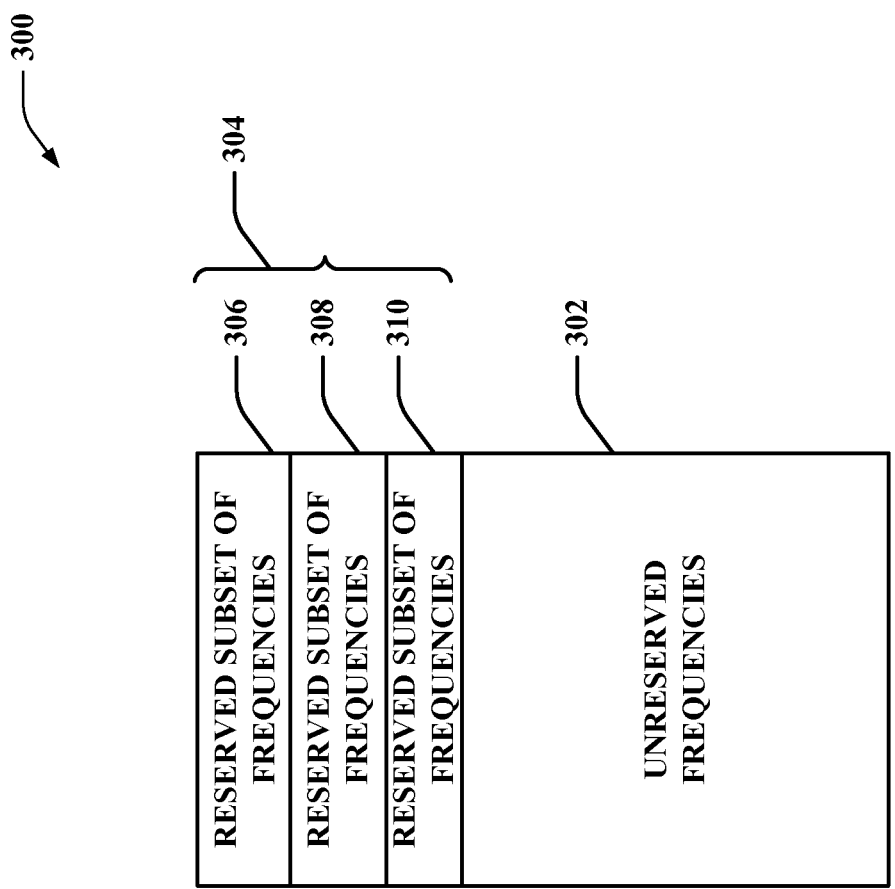
FIG. 3 is an illustration of frequency resource reservation in a wireless communication system in accordance with aspects described herein.

FIG. 3 is an illustration of frequency resource reservation in a wireless communication system in accordance with aspects described herein. A centralized controller (such as that described below with reference to FIG. 4) can be configured to control the assignment of the reserved subset of frequencies and the unreserved frequencies to the BSs. Referring to FIGS. 2 and 3, the frequency spectrum for the system 200 can be divided into an unreserved portion 302 and a reserved portion 304. The reserved portion 304 of the frequency spectrum can include one or more reserved subsets of frequencies, such as reserved subsets of frequencies 306, 308, 310. The reserved portions 306, 308, 310 can be assigned to one or more of the BSs 212, 214, 216, 218, 220 for communication over the reserved subsets of frequencies that correspond to the reserved portions 306, 308, 310. In some embodiments, each of the reserved subsets of frequencies can be a resource block (RB). In one embodiment, the system 200 could include five to seven RBs and each BS could be assigned to communicate over at least one of the RBs. In some embodiments, the reserved portion of the frequencies can correspond to a fractional frequency reuse ("FFR") channel. The physical frequency location of the various blocks is not limited to that shown in FIG. 3, as the frequency location of one or more of the RBs can be at any designated location on the frequency spectrum. In some embodiments, one or more of the reserved frequencies corresponding to the RBs can be contiguous or interleaved between one or more unreserved frequencies. By way of example, but not limitation, one or more of the RBs can be located at or near one or more frequencies at the upper end or at the lower end of the frequency spectrum. In embodiments, the transmission in the reserved frequencies can be performed through any number of methods including, but not limited, frequency hopping between different frequency locations.

Referring back to FIGS. 2 and 3, the unreserved portion 302 could be an unassigned portion of frequency over which any of the BSs 212, 214, 216, 218, 220 can communicate.

Figure 4:
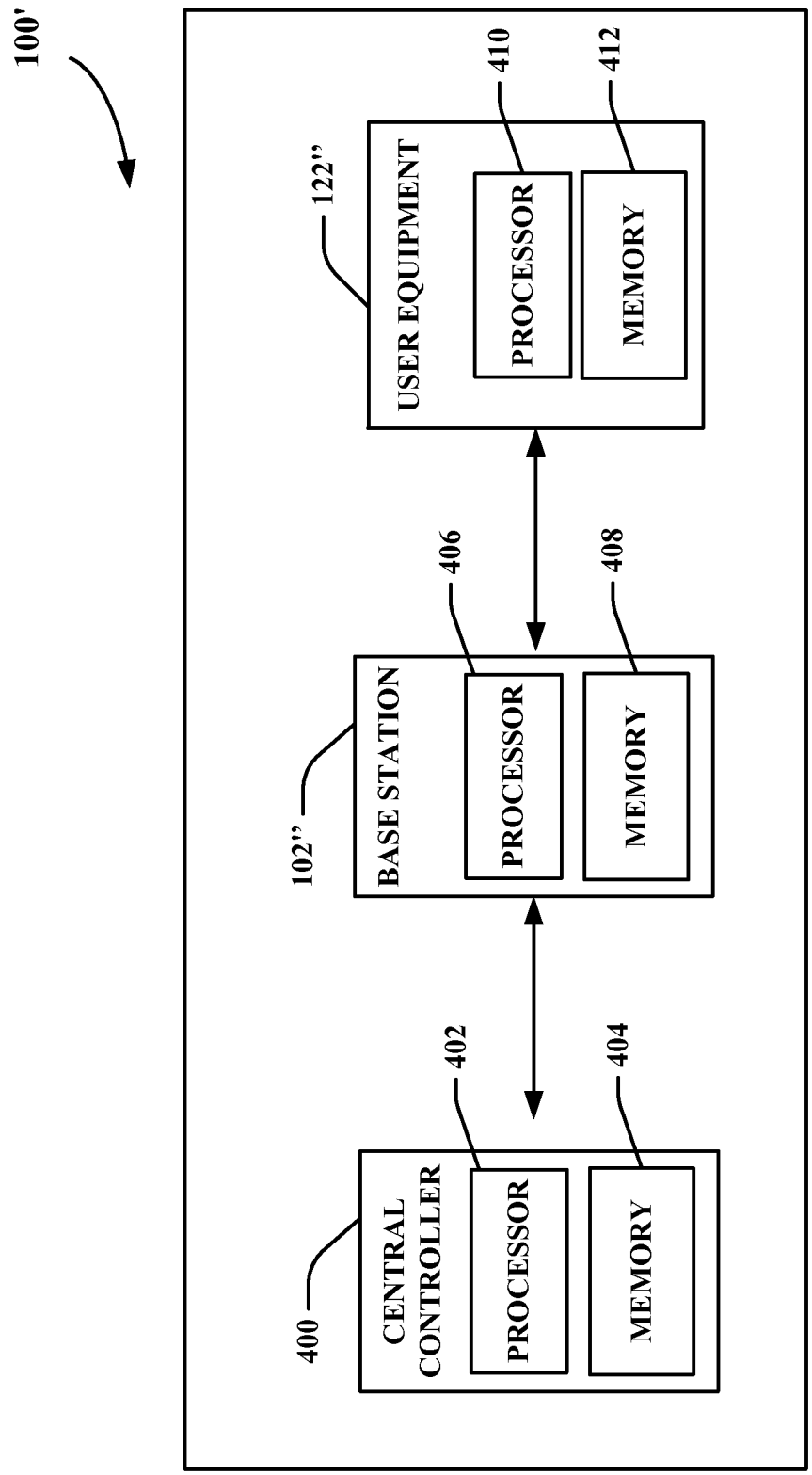
FIG. 4 is an illustration of another example system for facilitating handover control using resource reservation with frequency reuse in accordance with aspects described herein.

FIG. 4 is an illustration of another example system for facilitating handover control using resource reservation with frequency reuse in accordance with aspects described herein. The system 100' can include a central controller 400, a BS 102" and a UE 122". The central controller 400 can be communicatively coupled to the BS 102" and the BS 102" can be communicatively coupled to the UE 122". The system 100' can determine resource reservation in which to employ frequency reuse according to aspects described herein.

The central controller 400 can include a processor 402 and a memory 404. The processor 402 can be configured to determine a signalling traffic load in a cell managed by BS 102". In some embodiments, the signalling traffic load can be the amount of signalling traffic being communicated for handover and/or for any other function in the cell generating signalling traffic. In some embodiments, the signalling traffic load can include an amount of anticipated signalling traffic. The amount of anticipated signalling traffic could be based on the time, day, traffic patterns and/or the geographical proximity of UEs in a cell relative to other cells.

A frequency spectrum can be provided in the system for communication by the BSs and UEs in the system 100'. The processor 402 can determine a fraction of the frequency spectrum for allocation to each of BSs, including BS 102". The determination can be made based on the amount of the signalling traffic load, with the fraction of frequency spectrum allocated to the BS 102" increasing with an increase in signalling traffic load.

In some embodiments, the processor 402 can be configured to re-allocate the fraction of frequency spectrum allocated to one or more BSs. The re-allocation can be based on a change in traffic conditions, an increase or decrease in the number of BSs in the system 100' or otherwise. The fraction of the frequency spectrum allocated can correspond to one or more reserved portions of frequency. By way of example, but not limitation, with reference to FIG. 3, the fraction of the frequency spectrum allocated to BS 102", could be the fraction of the frequency spectrum corresponding to the reserved subset of frequencies 306.

The processor 402 can also determine a frequency reuse scheme to employ over the reserved portion of frequency allocated to the one or more BSs. The processor 402 can perform the method described below with reference to FIG. 5 to determine the frequency reuse scheme to employ over the reserved portion of frequency.

The central controller 400 can also include a memory 404. The memory 404 can be configured to store any number of different types of information for performing the methods described herein, including, but not limited to, storing the signalling traffic load in one or more cells, the geographical proximity of UEs to potential target cells, the transmit powers of the BSs and/or the geographical proximity of BS 102" to neighboring BSs. The central controller 400 can be configured to transmit information, to the BS 102", indicative of the frequency reuse scheme that is determined by the central controller 400.

The BS 102" can include a processor 406 and a memory 408. Processor 406 and memory 408 can be communicatively coupled to one another. Processor 406 can be configured to perform any one or more of the functions described for BS 102, 102', 102", 212, 214, 216, 218, 220. In some embodiments, processor 406 executes the functions according to one or more instructions stored in memory 408 and/or received from the central controller 400.

The UE 122" can include a processor 410 and a memory 412. Processor 410 and memory 412 can be communicatively coupled to one another. Processor 410 can be configured to perform any one or more of the functions described for UE 116, 122, 122', 122". In some embodiments, processor 410 executes the functions according to one or more instructions stored in memory 412 and/or received from the central controller 400 and/or the BS 102, 102', 102", 212, 214, 216, 218, 220.

In some embodiments, a method of the system 100' (not shown) can be as followed. The method can include: determining, by the central controller 400, a signalling traffic load in a cell managed by a first base station; and determining, by the central controller 400, a fraction of a frequency spectrum for allocation to the first base station. The determination of the fraction of the frequency spectrum can be made based on the signalling traffic load and a position of a first base station relative to other base stations, and the fraction of the frequency spectrum can correspond to a reserved portion of frequency. The method can also include determining, by the central controller 400, a frequency reuse scheme to employ over the reserved portion of frequency; transmitting, from the central controller 400, information indicative of the frequency reuse scheme to the first base station; measuring, at UE 122", channel conditions; and outputting, from the UE 122", information indicative of channel conditions. The method can also include: receiving, at BS 102", the information indicative of the frequency reuse scheme; receiving, at the BS 102", the information indicative of channel conditions; and scheduling, at the BS 102", communication for the UE 122" on the reserved portion of frequency, in response to the channel conditions being below a selected level. The scheduled communication can be handover signalling communication.

Figure 5:
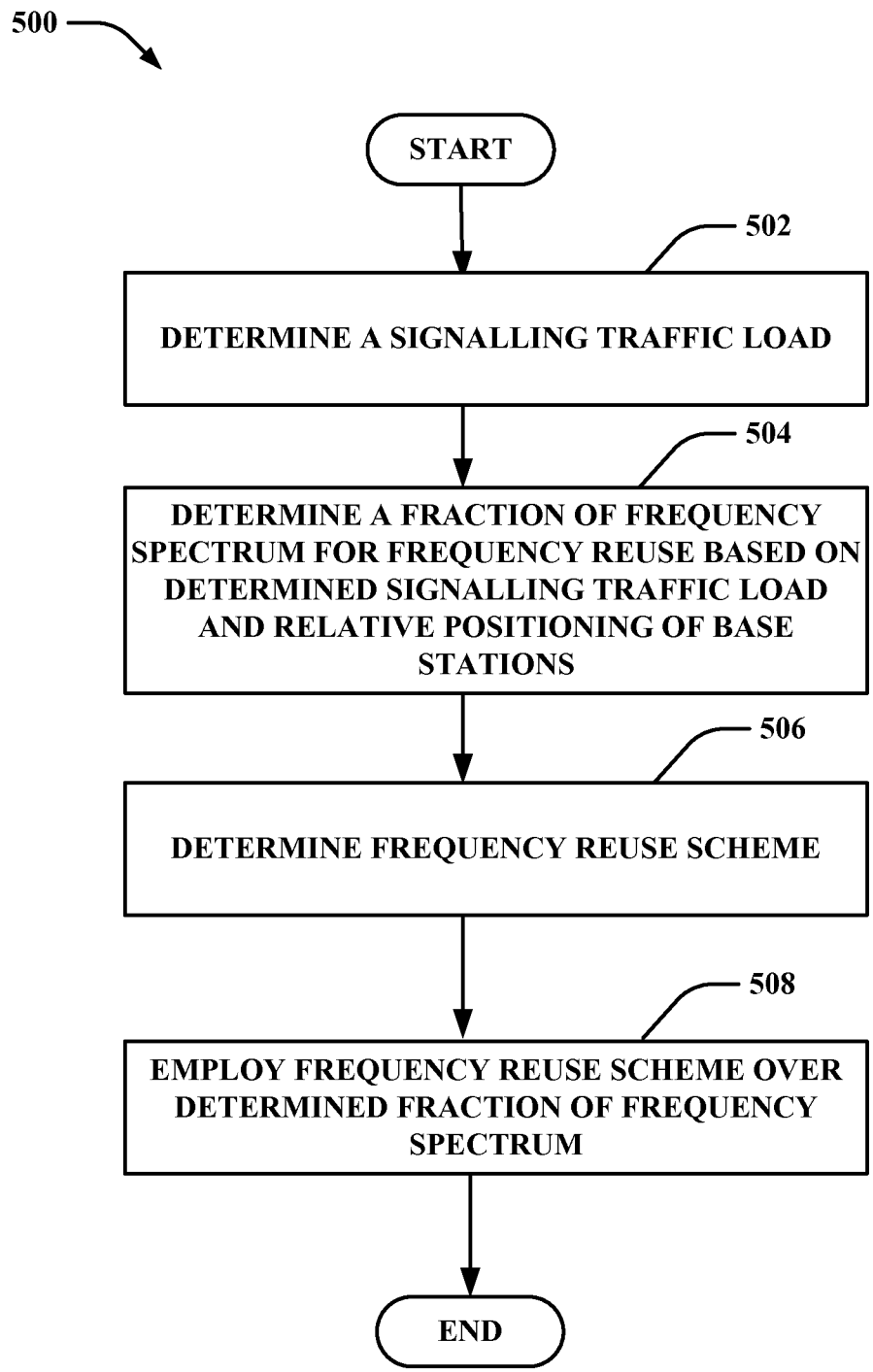
FIG. 5 is a flowchart illustrating a method of resource reservation employing frequency reuse in accordance with aspects described herein.

FIG. 5 is a flowchart illustrating a method of resource reservation employing frequency reuse in accordance with aspects described herein. With reference to FIGS. 4 and 5, in some embodiments, the method 500 can be performed by the central controller 400. The method 500 can include determining a signalling traffic load 502 in a cell managed by BS 102". At 504, the method 500 can include determining a fraction of a frequency spectrum for allocation to the BS 212. At 506, the method can include determining a frequency reuse scheme to employ over the reserved portion of frequency. At 508, the method can include employing the frequency reuse scheme over the fraction of the frequency spectrum corresponding to the reserved frequencies. Accordingly, frequency reuse can be employed only over a selected portion of frequencies in a frequency spectrum. The method can also include transmitting (not shown) information indicative of the frequency reuse scheme. The information can be transmitted to the BS 102".

Referring back to FIG. 4, the BS 102" can be configured to receive, from the central controller 400, the information indicative of the frequency reuse scheme. In some embodiments, the information can also include information identifying the reserved portion of frequency allocated to the BS 102", if any. The BS 102" can also be communicatively coupled to a UE 122" in the cell managed by the BS 102" and can receive, from the UE 122", information indicative of the channel conditions experienced by the UE 122". The channel conditions can be current channel conditions and/or past channel conditions. In some embodiments, the channel conditions can be the channel conditions that the UE anticipates experiencing in the near future.

The BS 102" can compare the information indicative of the channel conditions experienced at the UE 122" to a selected level, such as a threshold value. When the channel conditions are less than the selected level, channel conditions can be considered to be poor, and the BS can provide signalling support to the UE 122" by scheduling the UE 122" to conduct signalling communication in the reserved portion of the frequency band. For example, the BS 102" can schedule the UE 122" to communicate handover signalling information over the reserved portions of frequency in order to increase the likelihood for successful handover notwithstanding the poor channel conditions.

The UE 122" can be configured to measure channel conditions, and can therefore send the information indicative of the channel conditions to the BS 102". In various embodiments, channel conditions can include, but are not limited to, the transmit power of signals from the BS 102" and from other BSs (not shown) in the system that the UE 122" can detect; a channel quality indicator (CQI); a received signal strength indicator (RSSI) measurement; a received signal strength; a reference signal received power (RSRP); a reference signal received quality (RSRQ); and/or any other variable that can be measured by the UE and used by the BS 102" to determine the channel quality experienced by the UE 122". In various embodiments, the received signal strength can be the received signal strength for a selected cell and can therefore be cell-specific.

Figure 6:
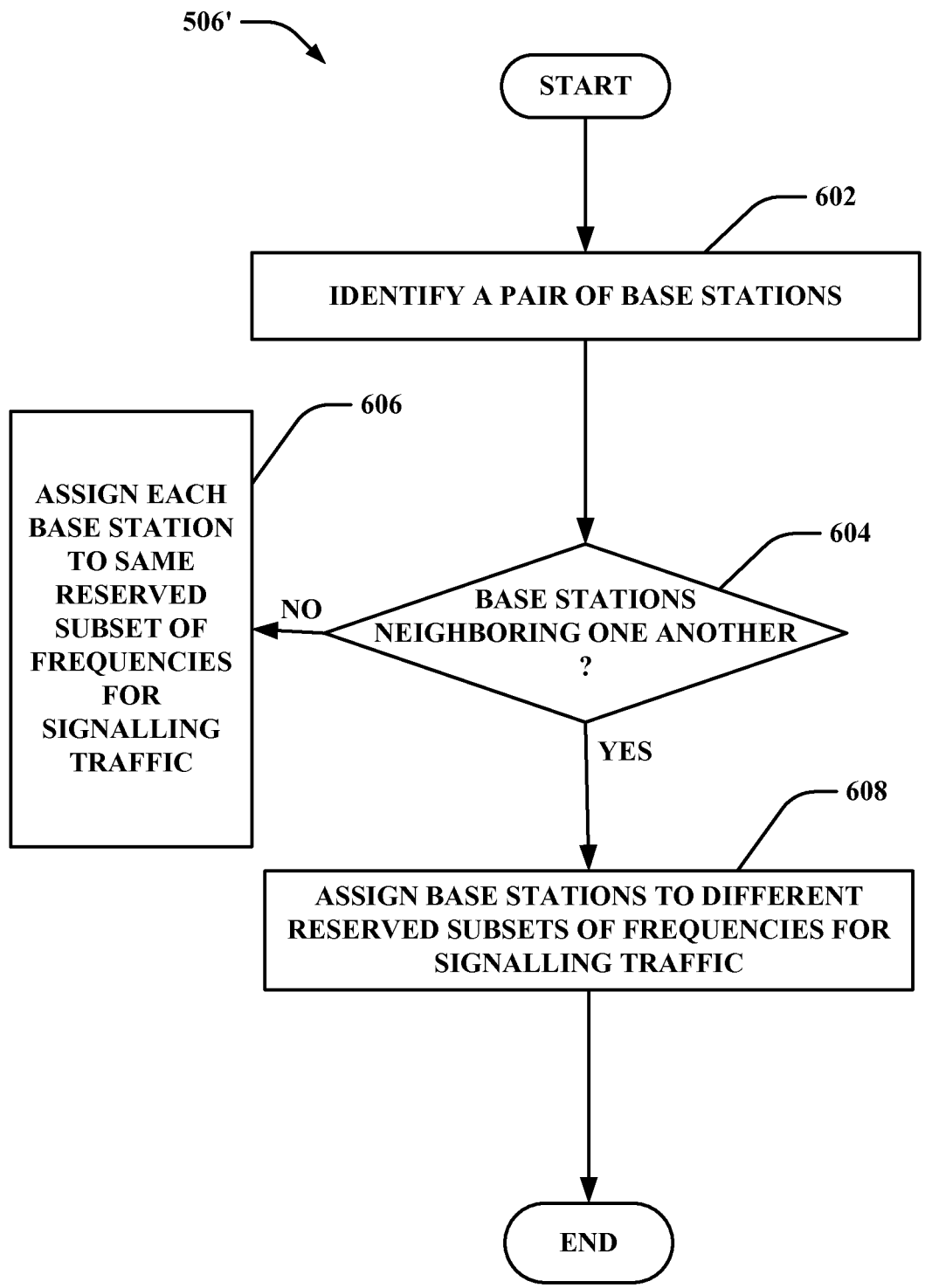
FIGS. 6-8 are flowcharts illustrating methods of determining frequency reuse schemes in accordance with aspects described herein.
Figure 7:
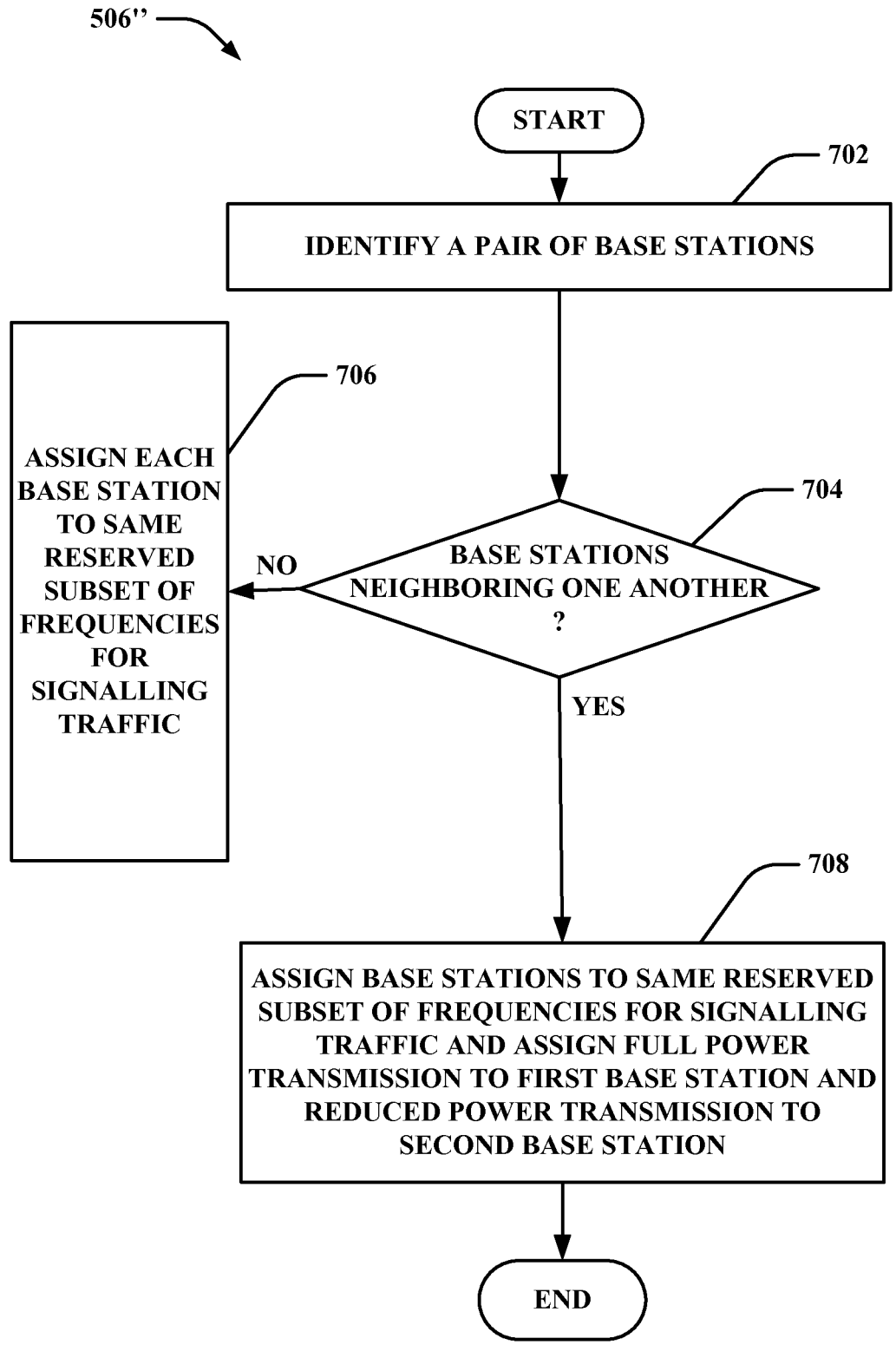
Figure 8:
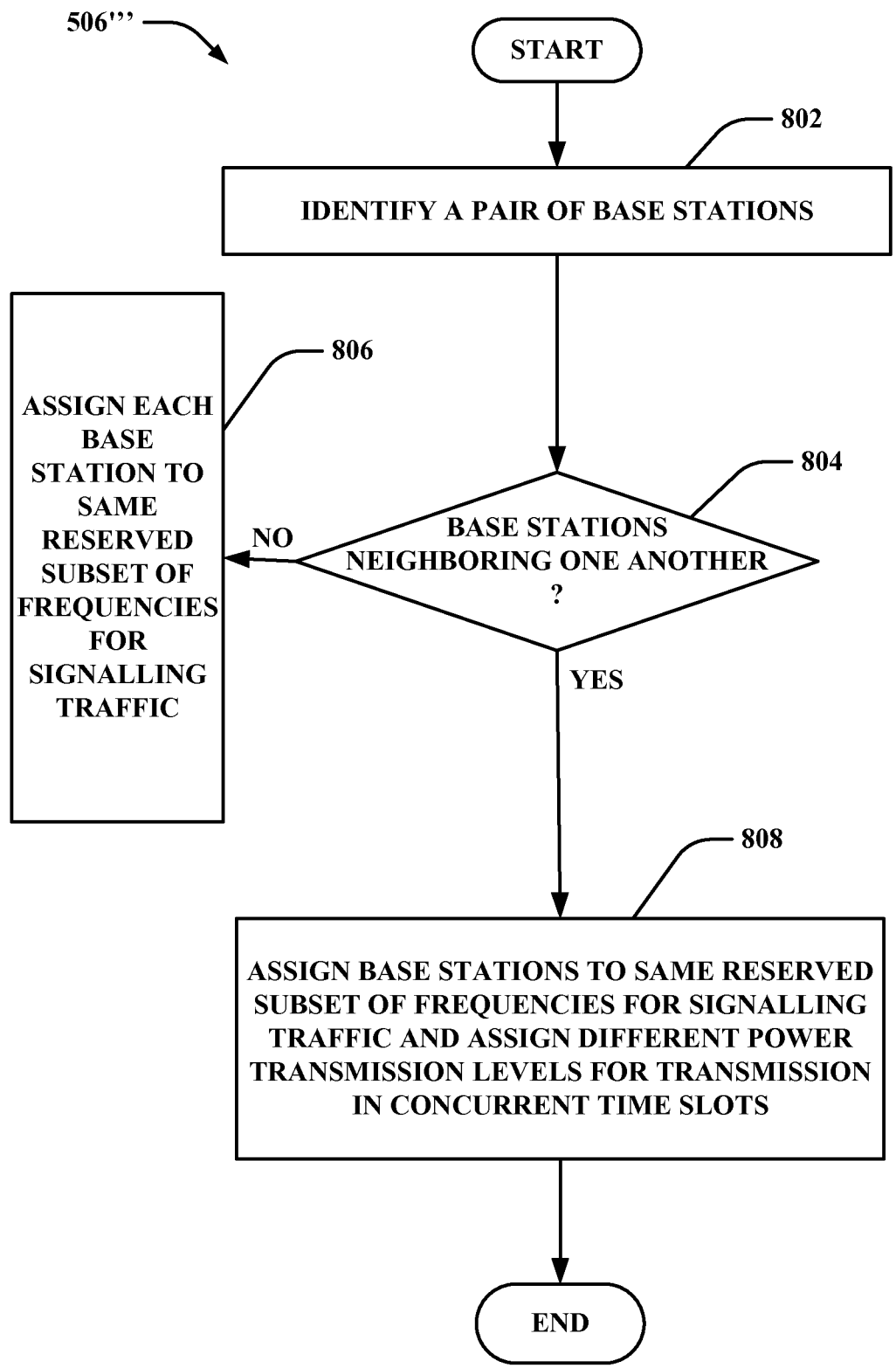

FIGS. 6-8 are illustrations of flowcharts describing frequency reuse schemes to be employed over reserved portions of frequencies as described herein. The manner of determining which BSs in a system can be assigned to which reserved portion of frequency can be performed according to these methods. As such, FIGS. 6-8 can illustrate embodiments of methods that can be performed at 506 of FIG. 5. Thus, FIGS. 6-8 are referred to as methods 506', 506" and 506'", respectively.

Referring first to FIG. 6, at 602, the method 506' can include identifying a pair of BSs. For example, the method 506' can identify BS 102" and BS 102'. At 604, the method 506' can determine whether the BS 102" and the BS 102' are neighboring BSs. If the BSs are neighboring, at 608, the method 506' can assign the BS 102" to a different reserved subset of frequencies than that assigned to BS 102'. If the BSs are non-neighboring, at 606, the method 506' can assign the BS 102" and the BS 102' to the same reserved subset of frequencies. The BSs can be assigned to the reserved subsets of frequencies to communicate signalling traffic. By way of example, but not limitation, the signalling traffic can be handover signalling messages. In some embodiments, the assignment can also allow a BS to communicate data over the reserved subset of frequencies when reserved frequency resources are available. For example, if the BS is not communicating signalling information at a selected time, the assignment can allow the BS to communicate data to maintain an acceptable level of efficiency with regard to bandwidth usage.

Turning to FIG. 7, at 702, the method 506" can include identifying a pair of BSs. For example, the method 506" can identify BS 102" and BS 102'. At 704, the method 506" can determine whether the BS 102" and the BS 102' are neighboring BSs. At 708, if the BSs are neighboring, the method 506" can assign BS 102" and BS 102' to the same reserved frequencies and assign full power transmission to one BS and reduced power to the other BS. For example, the method 506" can assign full power transmission to BS 102" and assign reduced power transmission to BS 102'. If the BSs are non-neighboring, at 706, the method 506" can assign BS 102" and BS 102' to the same reserved subset of frequencies without power level assignments. The BSs can be assigned to the reserved subset of frequencies to communicate signalling traffic. By way of example, but not limitation, the signalling traffic could be handover signalling messages. In some embodiments, the assignment can also allow a BS to communicate data over the reserved subset of frequencies when reserved frequency resources are available. For example, if the BS is not communicating signalling information at a selected time, the assignment can allow the BS to communicate data to maintain an acceptable level of efficiency with regard to bandwidth usage.

Now turning to FIG. 8, at 802, the method 506''' can include identifying a pair of BSs. For example, the method 506''' can identify BS 102" and BS 102'. At 804, the method 506''' can determine whether the BS 102" and the BS 102' are neighboring BSs. At 808, if the BSs are neighboring, the method 506' can assign BS 102" and BS 102' to the same reserved frequencies and assign different transmit power levels to the BSs 102", 102'. The transmit power levels can control the level of power output for transmissions from the BS 102" and the BS 102' during concurrent time slots. At 806, if the BSs are non-neighboring, the method can assign the BS 102" and the BS 102' to the same reserved subset of frequencies. The BSs can be assigned to the reserved subset of frequencies to communicate signalling traffic. By way of example, but not limitation, the signalling traffic could be handover signalling messages. In some embodiments, the assignment can also allow a BS to communicate data over the reserved subset of frequencies when reserved frequency resources are available. For example, if the BS is not communicating signalling information at a selected time, the assignment can allow the BS to communicate data to maintain an acceptable level of efficiency with regard to bandwidth usage.

Figure 9:
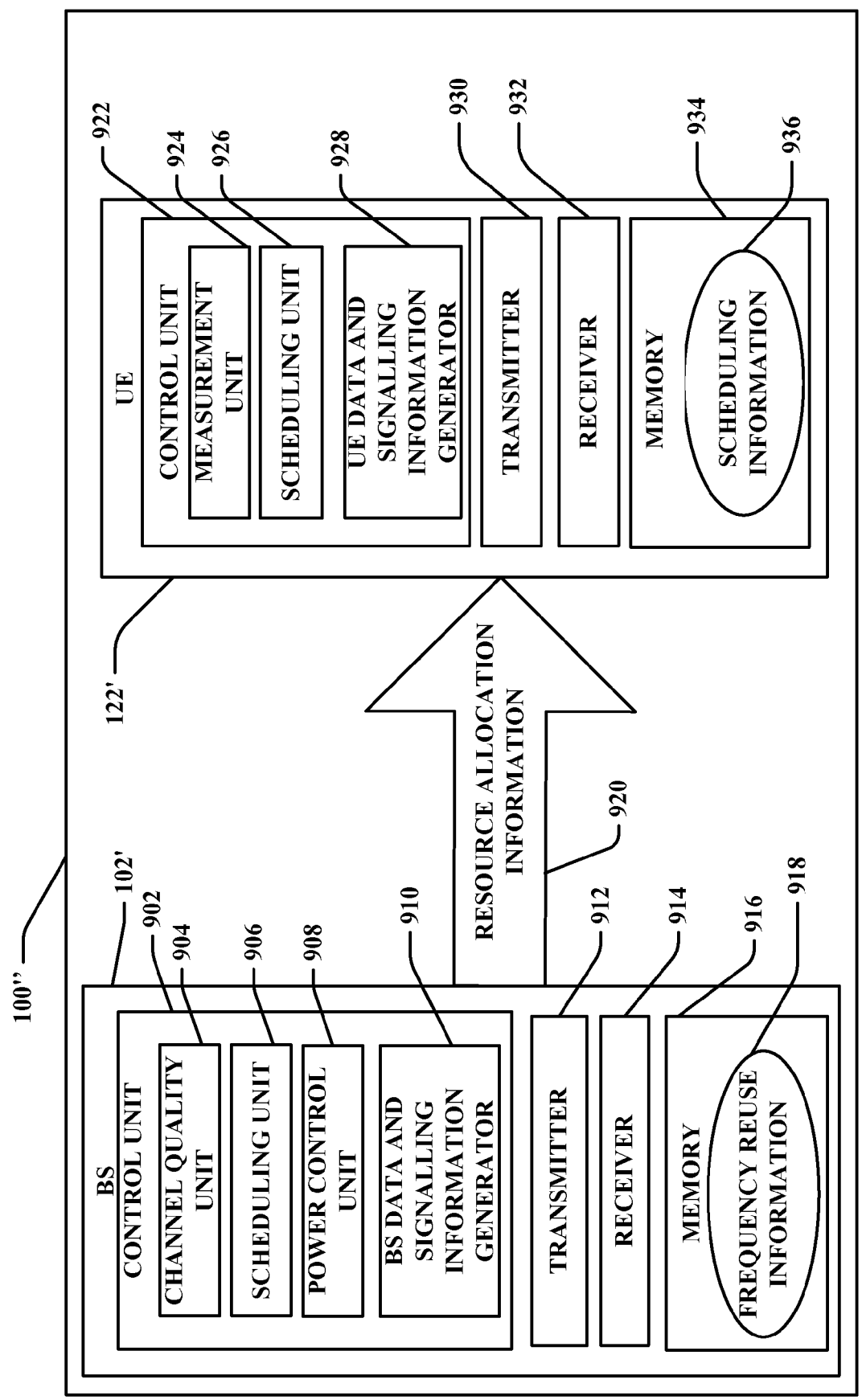
FIGS. 9, 10A, 10B, 10C, 10D, 10E, 11A and 11B are illustrations of example systems for facilitating handover control using resource reservation with frequency reuse in accordance with aspects described herein.

FIG. 9 is an illustration of an example system for facilitating handover control using resource reservation with frequency reuse in accordance with aspects described herein. In the embodiment shown, the system 100" can include a BS 102'and a UE 122'. The BS 102' can be communicatively coupled to the UE 122' for communicating resource allocation information and/or any other data or signalling information to the UE 122'. Analogously, while not shown, the UE 122' can communicate data or signalling information to the BS 102' over an UL. The BS 102' and the UE 122' can also receive information from one another over a DL and an UL, respectively. In some embodiments, the DL can be such as the DL over which the resource allocation information 920 is received.

The BS 102' can include a control unit 902, a transmitter 912, a receiver 914 and a memory 916. The control unit 902 can include a channel quality unit 904, a scheduling unit 906, a power control unit 908 and a BS data and signalling information generator 910. The channel quality unit 904 can be configured for determining a quality of the channel experienced by the UE 122'. The channel quality unit 904 can determine the quality of the channel based on any of a number of different types of information received from the UE 122', including, but not limited to, a received signal strength, a RSRP, a RSRQ, RSSI measurements, CQI information and/or transmit power experienced from the BS 102' at the UE 122'. In various embodiments, the channel quality unit 904 can determine the quality of the channel according to the methods described below with reference to FIGS. 13 and 14.

The scheduling unit 906 can be configured for scheduling the UE 122' (or any other UEs in the cell managed by the BS 102') for communication on a reserved portion of frequency assigned to the BS 102' and/or on an unreserved portion of frequency. The scheduling can be for communication by the UE 122' on the DL or the UL. In some embodiments, the BS can select the UEs to be scheduled based on a likelihood that the UE 122' does or will require handover support, does or will perform handover and/or based on the channel conditions experienced by the UE 122'. In various embodiments, the scheduling unit 906 can schedule the UEs according to the methods described below with reference to FIGS. 12, 13 and 14.

Referring back to FIG. 9, the power control unit 908 can be configured to control the level of power in the signals output from the BS 102'. For example, with reference to the method of performing frequency reuse described with reference to FIGS. 7 and 8, the power control unit 908 can control whether the BS 102' outputs the full transmit power level or a reduced power level. Accordingly, in some embodiments, the power control unit 908 can control power according to the frequency reuse scheme by which the BS 102' operates.

The BS data and signalling information generator 910 can be configured to generate data or signalling information for transmission to the UE 122'. The signalling information can be any signalling information. In some embodiments, the signalling information can be information for handover of the UE 122' from the BS 102' to another BS. The BS data and signalling information generator 910 can generate data or signalling information for transmission on selected frequencies according to the frequency reuse scheme described above with reference to FIGS. 6, 7 and 8. By way of example, but not limitation, the BS data and signalling information generator can operate according to a method whereby signalling information, including, but not limited to, handover information, can be transmitted and received on a reserved portion of frequencies assigned to the BS 102', while the data can be transmitted and received on the unreserved portion of frequencies. During time periods whereby the reserved portions of frequencies are not fully allocated to UEs or the UEs do not require the handover or other signalling support, the BS data and signalling information generator 910 can be configured to generate data for transmission on the reserved portion of frequency.

The transmitter 912 can be configured to transmit the data or signalling information from the BS 102'. In some embodiments, the transmitter 912 can transmit the data or signalling information on selected frequencies based on the type of the information. For example, the transmitter 912 can be configured to transmit data on the unreserved frequencies in the system while transmitting signalling information on the reserved portion of frequencies.

As another example, the transmitter 912 can be configured to transmit resource allocation information to the UE 122'. The resource allocation information can include, but is not limited to, the frequencies on which the UE 122' is scheduled to communicate on the UL and/or the DL, the type of information that the UE 122' can transmit or receive on the reserved and/or unreserved frequencies, the reserved and/or unreserved frequencies on which the UE 122' is scheduled to communicate, the time slots for communication on the UL and/or the DL.

The receiver 914 can be configured to receive data or signalling information from the UE 122'. In some embodiments, the receiver 914 can receive the data or signalling information on selected frequencies based on the type of the information. For example, the receiver 914 can be configured to receive data on the unreserved frequencies while receiving signalling information on the reserved portion of frequencies.

In some embodiments, the receiver 914 can be configured to receive transmissions from the UE 122' over a random access channel. For example, the UE 122' can employ an approach whereby the UE 122' selects a random access channel in a reserved portion of the frequency to improve the chances that a UE 122' will successfully access the channel. The UE 122' can autonomously determine which random access channel to select based on any number of factors that improve the likelihood that another UE will not collide with the UE 122' will the UE 122' is attempting to successfully access the random access channel. In some embodiments, the UE 122' can select a random access channel in a frequency band that is included in the reserved portion of the frequency. As such, in these embodiments, only the UEs having poor channel conditions and/or preparing to initiate handover, are likely to be assigned to the reserved portion, and access the random access channel in the reserved portion of frequency can be accessed by fewer UEs than the random access channel(s) in the unreserved portion of frequency. Accordingly, the UE can improve the chances of communicating over the random access channel without collision.

The BS 102' can also include a memory 916 configured to store frequency reuse information 918. In some embodiments, the memory 916 can also store computer code for performing any of the functions and/or methods described as performed by any of the BSs herein. The frequency reuse information 918 can include, but is not limited to, information indicative of the reserved and unreserved portions of the frequency band assigned to the BS 102' and/or the UEs assigned to the reserved and unreserved portions of the frequency band.

The UE 122' can include a control unit 922, a transmitter 930, a receiver 932 and a memory 934. The control unit 922 can include a measurement unit 924, a scheduling unit 926 and a UE data signalling information generator 928. The measurement unit 924 can be configured for measuring signal power from the BS 102' and a target BS (not shown) to determine if handover from BS 102' to the target BS should be performed. In various embodiments, the measurement unit 924 can measure the received signal strength, the RSRP and/or RSRQ from BS 102' and a target BS, the transmit power from the BS 102' or the target BS and/or measurements for determining the CQI.

The scheduling unit 926 can be configured for scheduling of transmission and/or reception of information to and/or from the UE 122' on the DL and/or the UL. In some embodiments, the scheduling unit 926 can be configured to schedule data and/or signalling information on the frequencies on which the UE 122' is allocated to transmit and receive such information as dictated by the resource allocation information received from the BS 102' and stored as scheduling information 936 in memory 934.

The UE data and signalling information generator 928 can be configured to generate data or signalling information for transmission from the UE 122'. The signalling information can be any signalling or control information. In some embodiments, the signalling information can be a handover signalling messages for handover of the UE 122' from the BS 102' to another BS. The UE data and signalling information generator 928 can generate data or signalling information for transmission on selected frequencies according to the frequency reuse scheme described above with reference to FIGS. 6, 7 and 8. By way of example, but not limitation, the UE data and signalling information generator 928 can operate according to a method whereby signalling information, including, but not limited to, handover information, can be transmitted and received on reserved portion of frequencies assigned to the source BS (i.e., BS 102') for the UE 122'.

The transmitter 930 can be configured to transmit the data or signalling information from the UE 122'. In some embodiments, the transmitter 930 can transmit the data or signalling information on selected frequencies based on the type of the information. For example, the transmitter 930 can be configured to transmit data on the unreserved frequencies while transmitting signalling information on the reserved portion of the frequency associated with BS 102'.

In some embodiments, as described above, the transmitter 930 can be configured to transmit transmissions from the UE 122' over a random access channel. For example, the UE 122' can employ an approach whereby the UE 122' selects a random access channel in a reserved portion of the frequency band to improve the chances that a UE 122' will successfully access the channel. The UE 122' can autonomously determine which random access channel to select based on any number of factors that improve the likelihood that another UE will not collide with the UE 122' while the UE 122' is attempting to successfully access the random access channel. In some embodiments, the UE 122' can select a random access channel in a frequency band that is included in the reserved portion of the frequency since, in some embodiments, only the UEs having poor channel conditions and/or preparing to initiate handover, will be assigned to the reserved portion and access the random access channel in the reserved portion of frequency.

The receiver 932 can be configured to receive data or signalling information from the BS 102'. In some embodiments, the receiver 932 can receive the data or signalling information on selected frequencies. For example, the receiver 932 can be configured to receive data on the unreserved frequencies while receiving signalling information on the reserved frequencies. As another example, the receiver 932 can be configured to receive resource allocation information 920 at the UE 122'. The resource allocation information 920 can include, but is not limited to, the frequencies on which the UE 122' is scheduled to communicate on the UL and/or the DL, the type of information that the UE 122' can transmit or receive on the reserved and/or unreserved frequencies that the UE 122' on which the UE 122' is scheduled to communicate, the time slots for communication on the UL and/or the DL and/or whether the UE 122' is scheduled for transmission only on the unreserved portion of frequency and/or whether the UE 122' is identified as a UE for scheduling signalling information on the reserved portion of frequency.

Figure 10A:
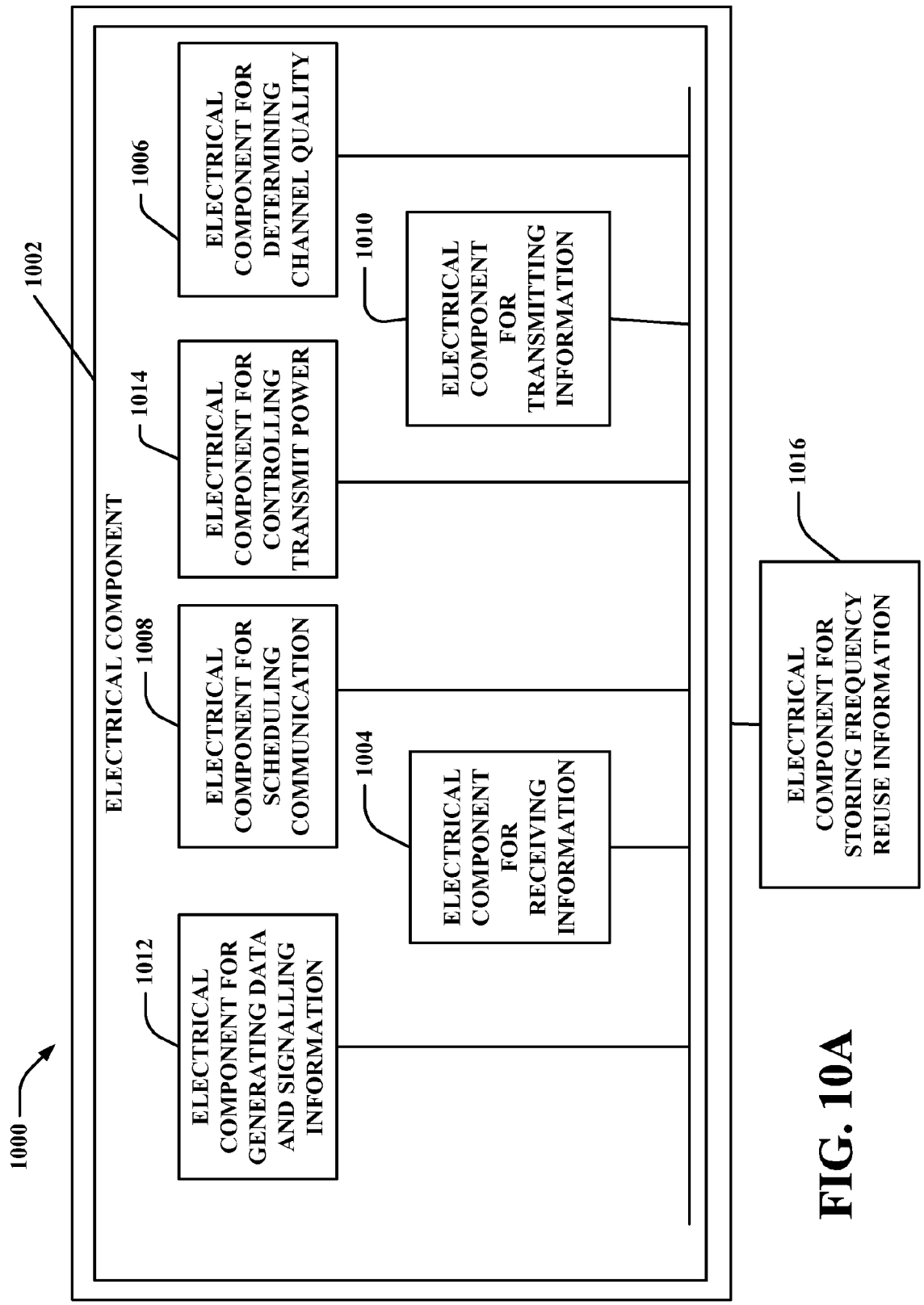

FIG. 10A is an illustration of a block diagram of a system for facilitating handover control using resource reservation with frequency reuse in accordance with aspects set forth herein. It is to be appreciated that system 1000 is represented as including functional blocks, which can be functional blocks that represent functions implemented by a processor, hardware, software, firmware, or combination thereof. System 1000 can include a logical or physical grouping 1002 of electrical components for facilitating handover control using resource reservation with a frequency reuse scheme.

The electrical components can act in conjunction. For instance, the logical or physical grouping 1002 can include an electrical component 1004 for receiving information. The electrical component 1004 for receiving information can be configured to receive frequency reuse information indicative of a reserved portion of a frequency band assigned to the system 1000. The electrical component 1004 for receiving information can also be configured to receive information indicative of a quality of a channel experienced at a UE (not shown). In some embodiments, the electrical component 1004 for receiving information can be the receiver 914 described with reference to FIG. 9 or the processor 406 described with reference to FIG. 4.

The logical or physical grouping 1002 can also include an electrical component 1006 for determining channel quality. The electrical component 1006 for determining channel quality can be configured to determine the quality of the channel experienced at the UE. The channel quality can be determined based on the information indicative of the quality of the channel that is received from the UE. In some embodiments, the electrical component 1006 for determining channel quality can be the channel quality unit 904 described with reference to FIG. 9 or the processor 406 described with reference to FIG. 4.

The logical or physical grouping 1002 can also include an electrical component 1008 for scheduling communication. The electrical component 1008 for scheduling information can be configured to schedule communication of information on a reserved portion or an unreserved portion of frequency based on the channel conditions at a UE. For example, the electrical component 1008 for scheduling information can be configured to schedule communication of signalling information on a reserved portion of a frequency band in response to the quality of the channel at a UE being less than a selected level. The signalling information can include, but is not limited to, handover signalling information for performing handover of the UE from the system 1000 to another system. In some embodiments, the electrical component 1008 for scheduling communication can be the scheduling unit 906 described with reference to FIG. 9 or the processor 406 described with reference to FIG. 4.

The logical or physical grouping 1002 can also include an electrical component 1010 for transmitting information. The electrical component 1010 for transmitting information can be configured to transmit, to the UE, resource allocation information indicative of the scheduled communication. The scheduled communication can be the information generated by the electrical component 1008 for scheduling communication. In some embodiments, the electrical component 1010 for transmitting information can be the transmitter 912 described with reference to FIG. 9 or the processor 406 described with reference to FIG. 4.

The logical or physical grouping 1002 can also include an electrical component 1012 for generating data and signalling information. The electrical component 1012 for generating data and signalling information can be configured to generate data for transmission on an unreserved portion of the frequency band and to generate signalling information for transmission on the first reserved portion of the frequency band. The timing for data or signalling information to be generated and/or whether the generated information is generated for transmission on the reserved portion of frequency or the unreserved portion of frequency can be dictated by the scheduling information generated at the electrical component 1008 for scheduling information. In some embodiments, the electrical component 1012 for generating data and signalling information can be the BS data and signalling information generator 910 described with reference to FIG. 9 or the processor 406 described with reference to FIG. 4.

The logical or physical grouping 1002 can also include an electrical component 1014 for controlling transmit power. The electrical component 1014 for controlling transmit power can be configured to control a power level of information transmitted from the system 1000. In some embodiments, the electrical component 1014 for controlling transmit power can be the power control unit 908 described with reference to FIG. 9 or the processor 406 described with reference to FIG. 4.

The logical or physical grouping 1002 can also include an electrical component 1016 for storing. The electrical component 1016 for storing can be configured to store frequency reuse information indicative of a frequency reuse scheme. In some embodiments, the electrical component 1016 for storing can be the memory 916 described with reference to FIG. 9 or the memory 408 described with reference to FIG. 4.

Figure 10B:
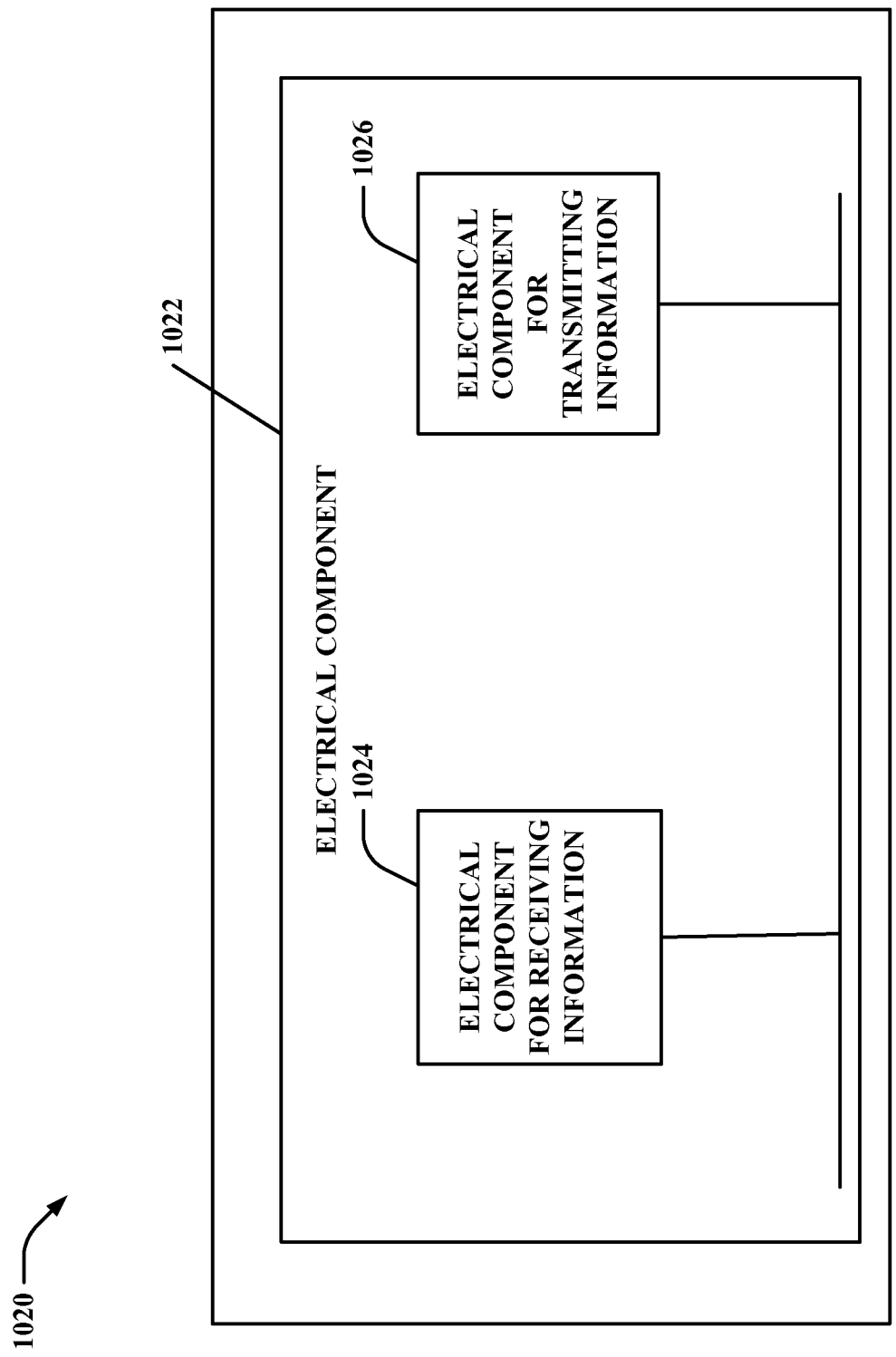

FIG. 10B is an illustration of a block diagram of a system for facilitating handover control using resource reservation with frequency reuse in accordance with aspects set forth herein. It is to be appreciated that system 1020 is represented as including functional blocks, which can be functional blocks that represent functions implemented by a processor, hardware, software, firmware, or combination thereof. System 1020 can include a logical or physical grouping 1022 of electrical components for facilitating handover control using resource reservation with a frequency reuse scheme.

The electrical components can act in conjunction. For instance, the logical or physical grouping 1022 can include an electrical component 1024 for receiving information. The electrical component 1024 for receiving information can be configured to receive frequency reuse information indicative of a reserved portion of a frequency band assigned to the system 1020. The reserved portion of the frequency band can be a fraction of a frequency spectrum. The fraction of the frequency spectrum can be determined based on a signalling traffic load for the system 1020, and a position of the apparatus associated with the system 1020 relative to a second apparatus. In some embodiments, the electrical component 1024 for receiving information can be the receiver 914 described with reference to FIG. 9 or the processor 406 described with reference to FIG. 4.

The logical or physical grouping 1022 can also include an electrical component 1026 for transmitting information. The electrical component 1026 for transmitting information can be configured to transmit signalling information over the reserved portion of the frequency band. In some embodiments, the electrical component 1026 for transmitting information can be the transmitter 912 described with reference to FIG. 9 or the processor 406 described with reference to FIG. 4.

Figure 10C:
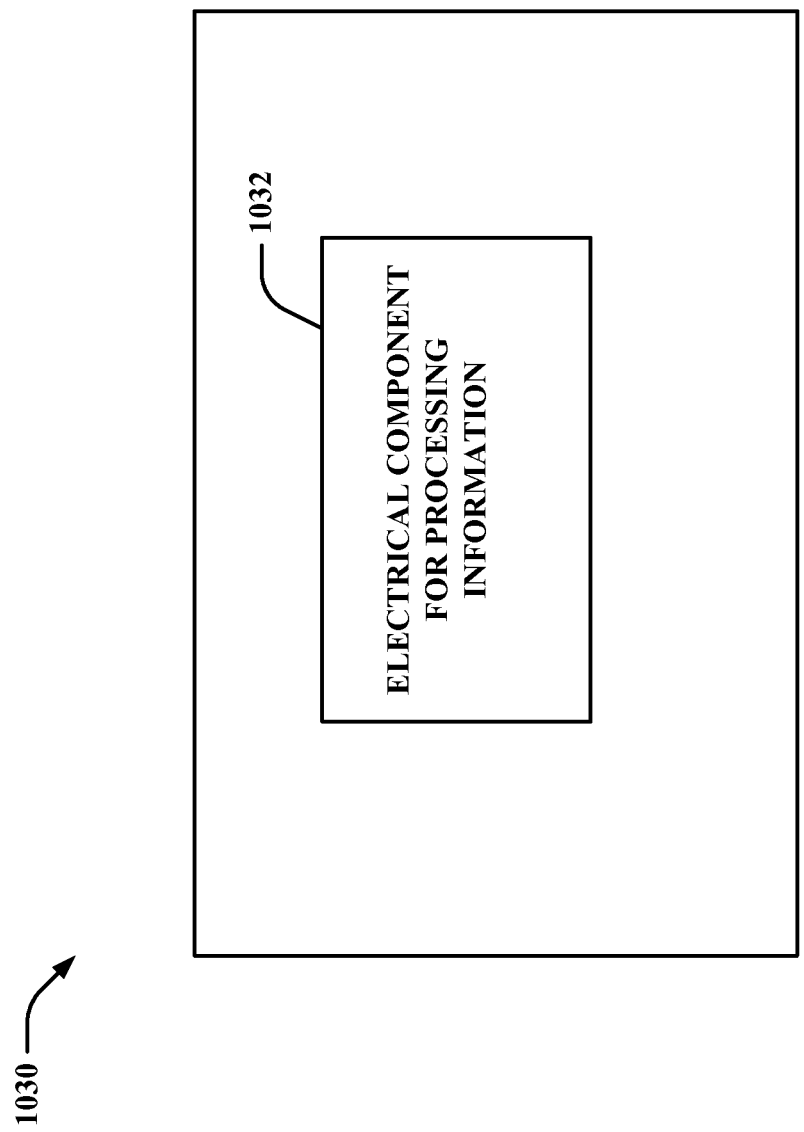

FIG. 10C is an illustration of a block diagram of a system for facilitating handover control using resource reservation with frequency reuse in accordance with aspects set forth herein. It is to be appreciated that system 1030 is represented as including functional blocks, which can be functional blocks that represent functions implemented by a processor, hardware, software, firmware, or combination thereof. System 1030 can include an electrical component 1032 for processing information. The electrical component 1032 for processing information can be configured to identify a pair of base stations in a wireless communication system. The pair of base stations can include a first base station and a second base station. The electrical component 1032 for processing information can also be configured to: determine if the first base station and the second base station are neighboring base stations; assign the first base station and the second base station to a same reserved subset of frequencies; and in response to the first base station and the second base station being neighboring base stations, assign full power transmission to the first base station and reduced power transmission to the second base station. In some embodiments, the electrical component 1032 for processing information can be the processor 402 described with reference to FIG. 4.

Figure 10D:
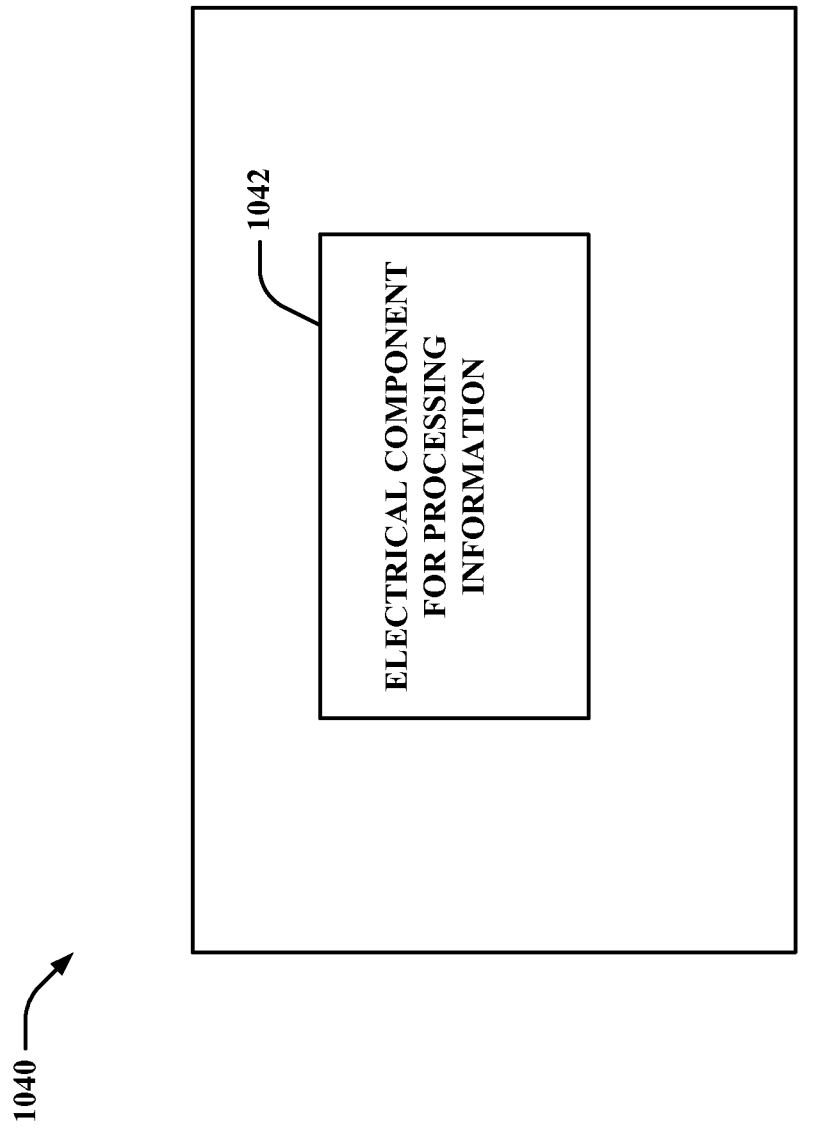

FIG. 10D is an illustration of a block diagram of a system for facilitating handover control using resource reservation with frequency reuse in accordance with aspects set forth herein. It is to be appreciated that system 1040 is represented as including functional blocks, which can be functional blocks that represent functions implemented by a processor, hardware, software, firmware, or combination thereof. System 1040 can include an electrical component 1042 for processing information. The electrical component 1042 for processing information can be configured to identify a pair of base stations in a wireless communication system. The pair of base stations can include a first base station and a second base station. The electrical component 1042 for processing information can also be configured to: determine if the first base station and the second base station are neighboring base stations; assign the first base station and the second base station to a same reserved subset of frequencies; and in response to the first base station and the second base station being neighboring base stations, assign a first power level to the first base station and a second power level to the second base station, the first power level and the second power level being different and being assigned for concurrent transmissions from the first base station and the second base station. In some embodiments, the electrical component 1042 for processing information can be the processor 402 described with reference to FIG. 4.

Figure 10E:
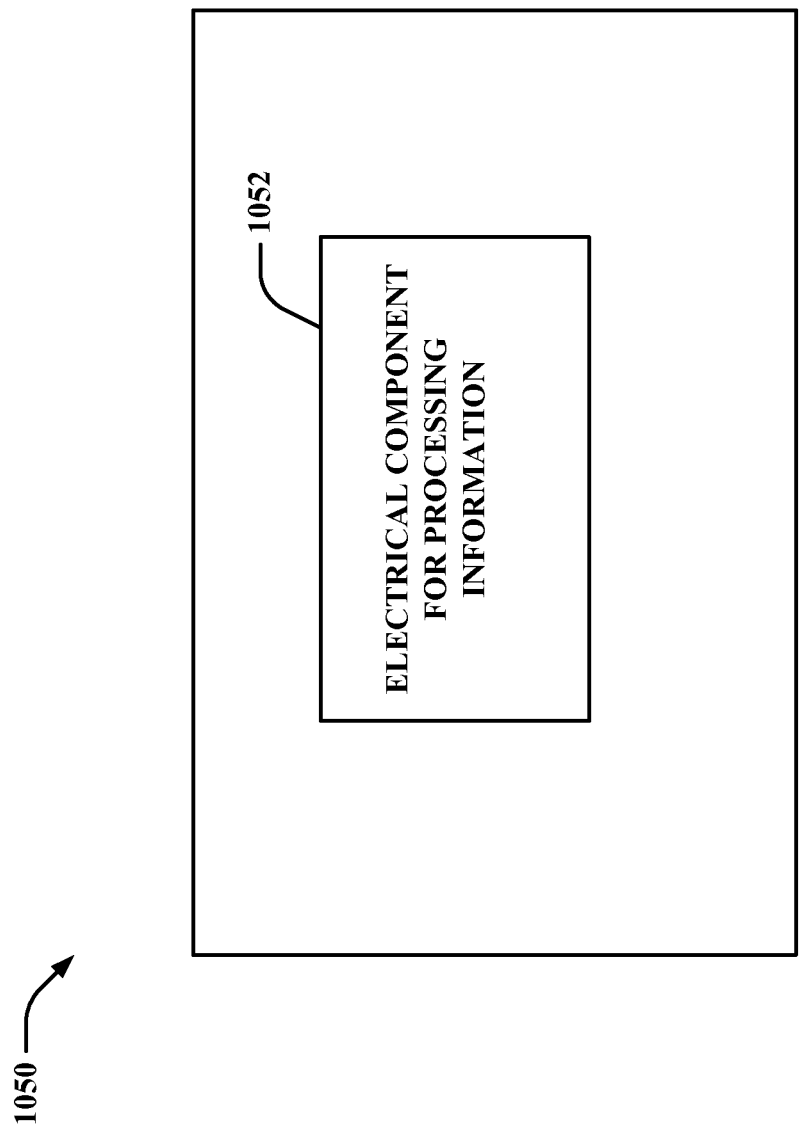

FIG. 10E is an illustration of a block diagram of a system for facilitating handover control using resource reservation with frequency reuse in accordance with aspects set forth herein. It is to be appreciated that system 1050 is represented as including functional blocks, which can be functional blocks that represent functions implemented by a processor, hardware, software, firmware, or combination thereof. System 1050 can include an electrical component 1052 for processing information. The electrical component 1052 for processing information can be configured to identify a pair of base stations in a wireless communication system. The pair of base stations can include a first base station and a second base station. The electrical component 1042 for processing information can also be configured to: determine if the first base station and the second base station are neighboring base stations; in response to the first base station and the second base station being neighboring base stations, assign the first base station to a first reserved subset of frequencies, and assign the second base station to a second reserved subset of frequencies; and in response to the first base station and the second base station not being neighboring base stations, assign the first base station and the second base station to a same reserved subset of frequencies.

In some embodiments, the electrical component 1042 for processing information can be the processor 402 described with reference to FIG. 4.

Figure 11A:
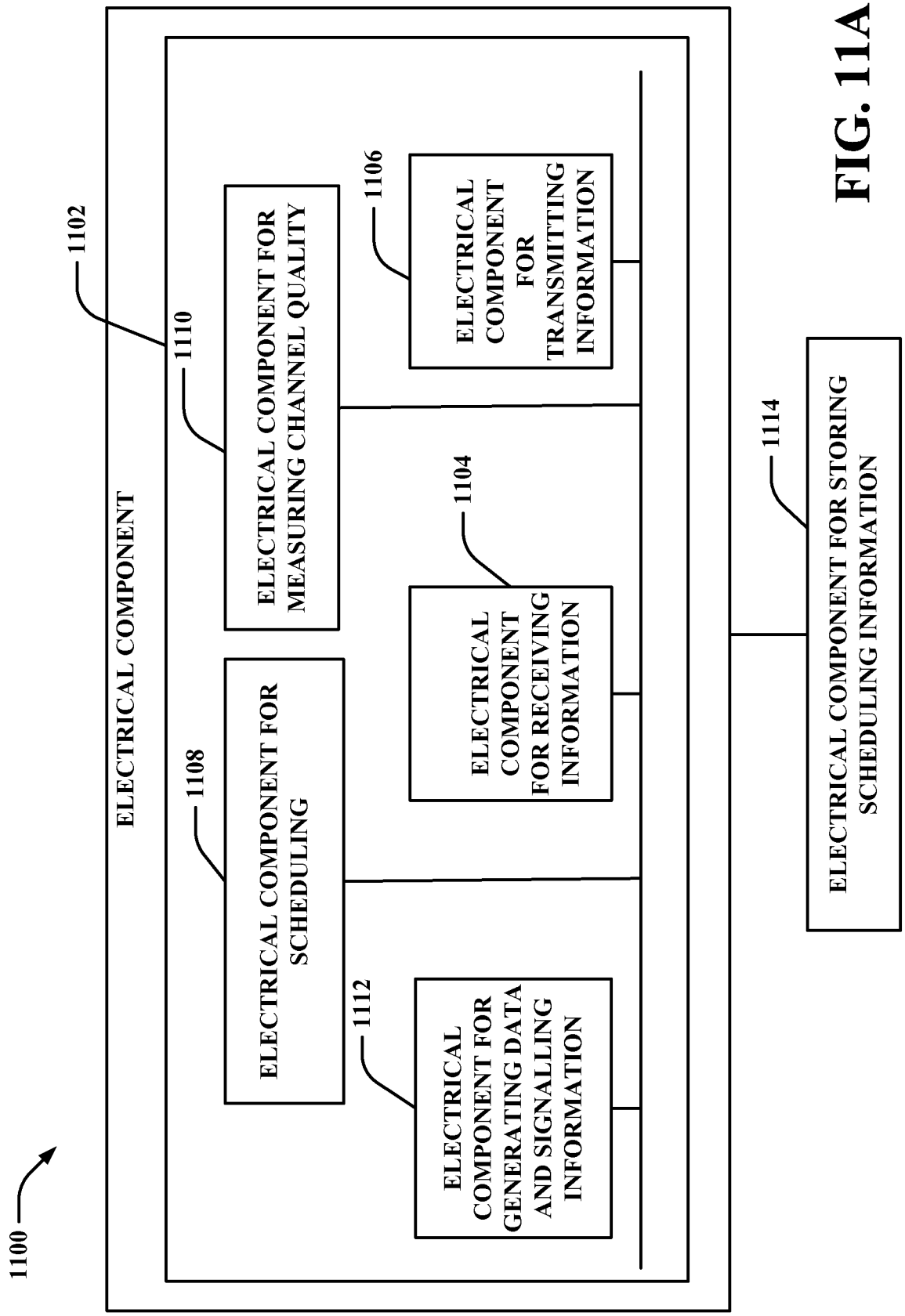

FIG. 11A is another illustration of a block diagram of a system for facilitating handover control using resource reservation with frequency reuse in accordance with aspects set forth herein. It is to be appreciated that system 1100 is represented as including functional blocks, which can be functional blocks that represent functions implemented by a processor, hardware, software, firmware, or combination thereof. System 1100 can include a logical or physical grouping 1102 of electrical components for facilitating handover control using resource reservation with frequency reuse.

The logical or physical grouping 1102 of electrical component can include an electrical component 1104 for receiving information, an electrical component 1106 for transmitting information, an electrical component 1108 for scheduling, an electrical component 1110 for measuring channel quality, an electrical component 1112 for generating data and signalling information and/or an electrical component 1114 for storing scheduling information.

The electrical components can act in conjunction. For instance, logical or physical grouping 1102 can include an electrical component 1104 for receiving resource allocation information. The resource allocation information can include scheduling information for causing the electrical component 1106 for transmitting information to transmit data or the signalling information on a reserved portion of frequency or on an unreserved portion of frequency. The resource allocation information can also include scheduling information for causing the electrical component 1108 for scheduling, to schedule the transmission and the reception of the information on the reserved portion of frequency or on the unreserved portion of frequency. In some embodiments, the electrical component 1104 for receiving information can be the receiver 932 described with reference to FIG. 9 or the processor 410 described with reference to FIG. 4.

The electrical component 1106 for transmitting information can be configured to transmit, to a BS serving the system 1100, information indicative of the quality of the channel experienced at the system 1100. In some embodiments, the electrical component 1106 for transmitting information can be the transmitter 930 described with reference to FIG. 9 or the processor 410 described with reference to FIG. 4.

The electrical component 1108 for scheduling can be configured to schedule transmission and reception of information on the reserved portion of frequency or on the unreserved portion of frequency. The scheduling can be performed based on the scheduling information received at the electrical component 1104 for receiving information. In some embodiments, the electrical component 1108 for scheduling information can be the scheduling unit 926 described with reference to FIG. 9 or the processor 410 described with reference to FIG. 4.

The electrical component 1110 for measuring channel quality can be configured to measure a quality of a channel experienced at the system 1100. The channel quality can be measured by measuring the received transmit power output from a BS managing a cell in which the system 1100 is located, a CQI at the system 1100 and/or a received signal strength measurement at the system 1100. In some embodiments, the electrical component 1110 for measuring channel quality can be the measurement unit 924 described with reference to FIG. 9 or the processor 410 described with reference to FIG. 4.

The electrical component 1112 for generating data and signalling information can be configured to generate data and signalling information for transmission on the reserved portion of frequency or the unreserved portion of frequency. The timing whereby the electrical component 1112 for generating data and signalling generates the data or signalling information and/or whether the generated information is generated for transmission on the reserved portion of frequency or the unreserved portion of frequency, can be dictated by the scheduling information received at the electrical component 1104 for receiving information. In some embodiments, the electrical component 1112 for generating data and signalling information can be the UE data and signalling information generator 928 described with reference to FIG. 9 or the processor 410 described with reference to FIG. 4.

The electrical component 1114 for storing can be configured to store the scheduling information received at the electrical component 1104 for receiving information. In some embodiments, the electrical component 1114 for storing can be the memory 934 described with reference to FIG. 9 or the memory 412 described with reference to FIG. 4.

Figure 11B:
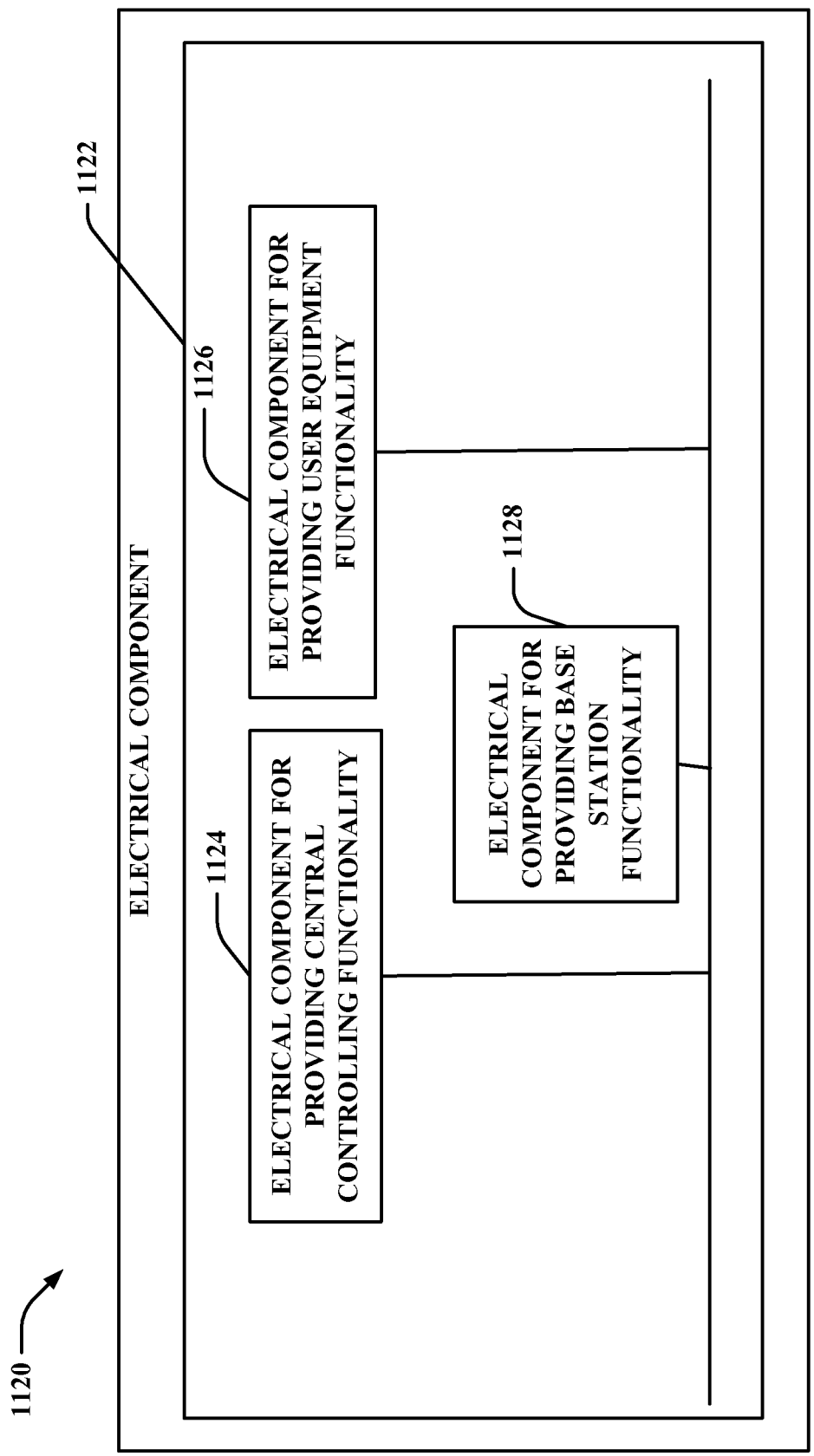

FIG. 11B is another illustration of a block diagram of a system for facilitating handover control using resource reservation with frequency reuse in accordance with aspects set forth herein. It is to be appreciated that system 1120 is represented as including functional blocks, which can be functional blocks that represent functions implemented by a processor, hardware, software, firmware, or combination thereof. System 1120 can include a logical or physical grouping 1122 of electrical components for facilitating handover control using resource reservation with frequency reuse.

The system 1120 can include an electrical component 1124 for providing central control functionality. The electrical component 1124 for providing central control functionality can be configured to: determine a signalling traffic load in a cell managed by a first base station; and determine a fraction of a frequency spectrum for allocation to the first base station, wherein determination of the fraction of the frequency spectrum is made based on the signalling traffic load and a position of the first base station relative to other base stations. The fraction of the frequency spectrum can correspond to a reserved portion of frequency. The electrical component 1124 for providing central control functionality can also be configured to: determine a frequency reuse scheme to employ over the reserved portion of frequency; and transmit information indicative of the frequency reuse scheme to the first base station. In some embodiments, the electrical component 1124 for providing central control functionality can be the central controller 400 described with reference to FIG. 4.

The system 1120 can also include an electrical component 1126 for providing user equipment functionality. The electrical component 1126 for providing user equipment functionality can be configured to: measure channel conditions; and output information indicative of channel conditions. In some embodiments, the electrical component 1126 for providing user equipment functionality can be the UE 122" described with reference to FIG. 4.

The system 1120 can also include an electrical component 1128 for providing base station functionality. The electrical component 1128 for providing base station functionality can be configured to: receive the information indicative of the frequency reuse scheme; receive the information indicative of channel conditions; and schedule communication for the user equipment on the reserved portion of frequency in response to the channel conditions being below a selected level, wherein a scheduled communication is handover signalling communication. In some embodiments, the electrical component 1128 for providing base station functionality can be the BS 102" described with reference to FIG. 4.

Figure 12:
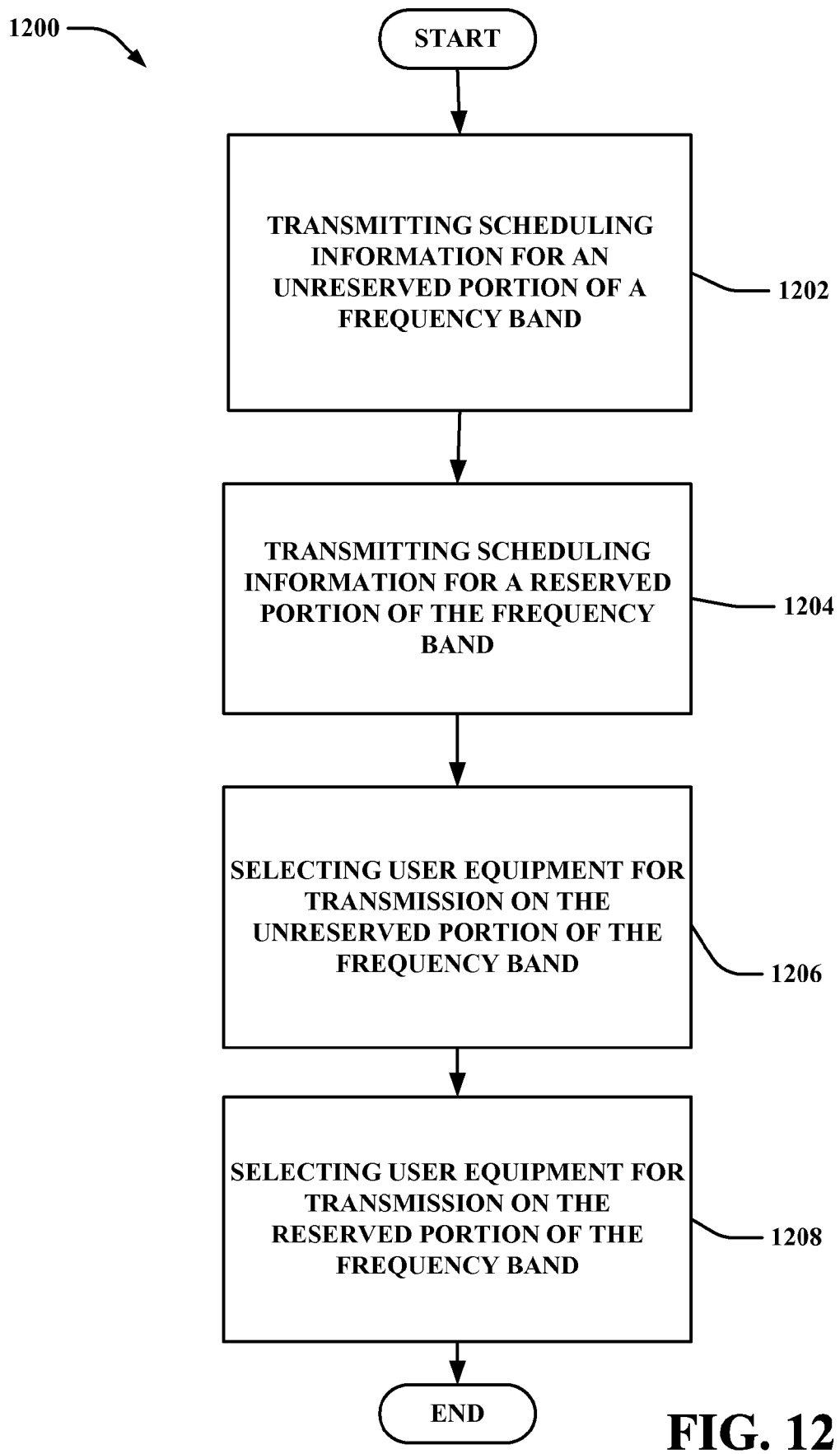
FIG. 12 is a flowchart illustrating a method for employing resource reservation using frequency reuse in accordance with aspects described herein.

FIG. 12 is a flowchart illustrating a method for employing resource reservation using frequency reuse in accordance with aspects described herein. In some embodiments, the method 1200 can include employing a processor for performing a number of acts. At 1202, the method 1200 can transmit scheduling information for transmission of information on frequencies corresponding to an unreserved portion of a frequency band. At 1204, the method 1200 can transmit scheduling information for transmission of information on one or more frequencies corresponding to a reserved portion of the frequency band. A frequency reuse scheme can be employed over the frequencies corresponding to the reserved portion of the frequency band. The transmission of scheduling information at 1202 and/or 1204 can be over a wired or wireless backhaul link communicatively coupling a central processor with one or more BSs. In one embodiment, the central processor can be the central controller 400 described with reference to FIG. 4.

In some embodiments, the frequency reuse scheme can include an assignment of a first BS and another BS to the one or more frequencies corresponding to the reserved portion of the frequency band. The BSs assigned to the reserved portion can be non-neighboring base station BSs. At 1206, the method 1200 can select a UE to be scheduled for transmission of information on the frequencies corresponding to the unreserved portion of the frequency band. At 1208, the method 1200 can perform select other UEs for transmission of information on the frequencies corresponding to the reserved portion of the frequency band.

In various embodiments, the method 1200 can be further adapted to include specific methods for identifying the UEs to be selected for scheduling. Accordingly, steps 1206 and 1208 can be as described at FIGS. 13 and 14.

The BS can identify UEs for scheduling on the reserved portion of frequencies in any number of ways. In some embodiments, when the BS receives information from the UE indicative of low signal quality (on either the UL and/or the DL) that triggers handover of the UE, the BS can compare the signal quality to a threshold value. If the signal quality is less than the threshold, the BS can schedule the UE for UL and/or DL communication on the reserved portion of the frequencies. For example, FIGS. 13 and 14 are flowcharts illustrating methods for selecting user equipment for which to employ resource reservation using frequency reuse in accordance with aspects described herein.

Figure 13:
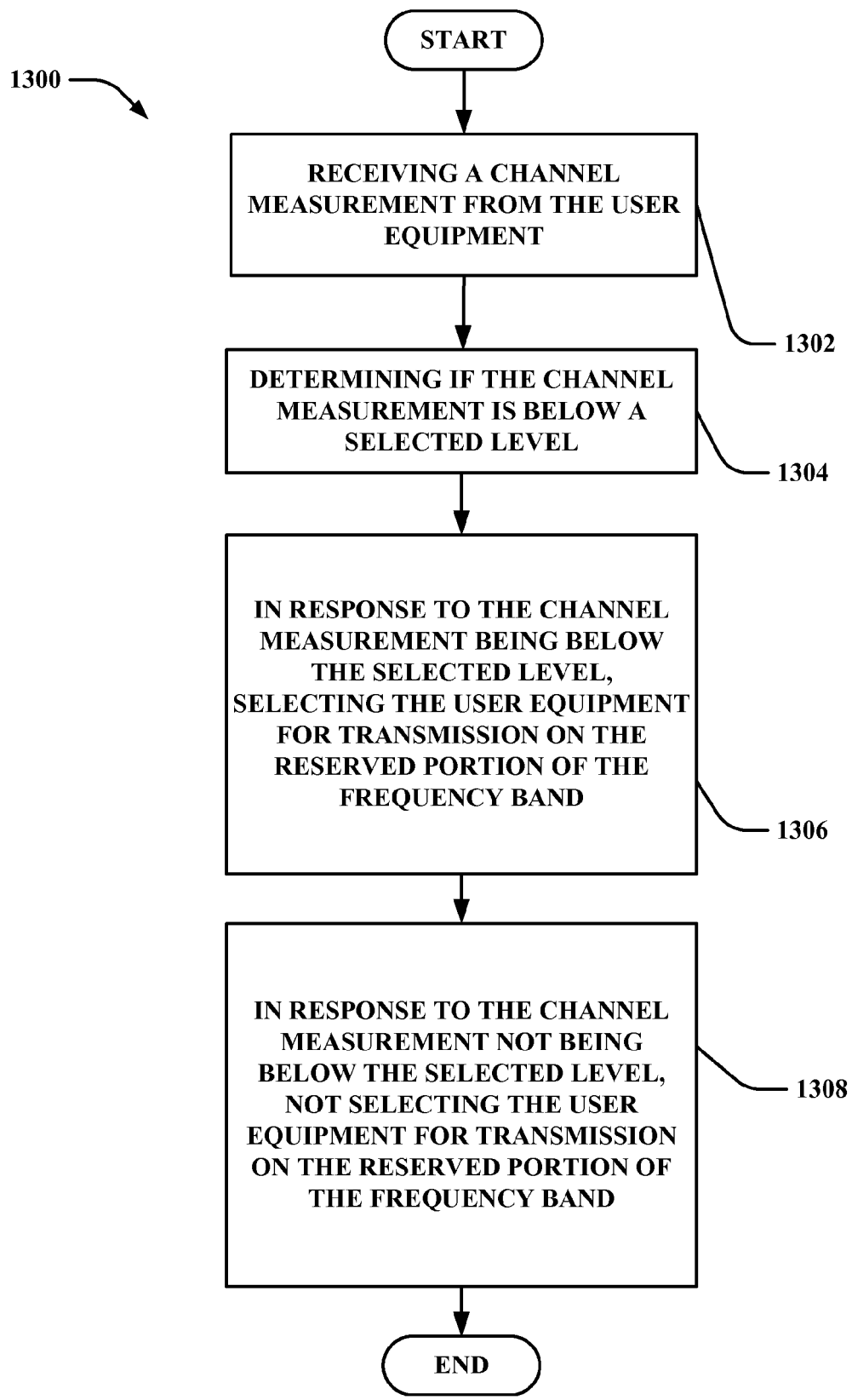
FIGS. 13 and 14 are flowcharts illustrating methods for selecting user equipment for which to employ resource reservation using frequency reuse in accordance with aspects described herein.
Figure 14:
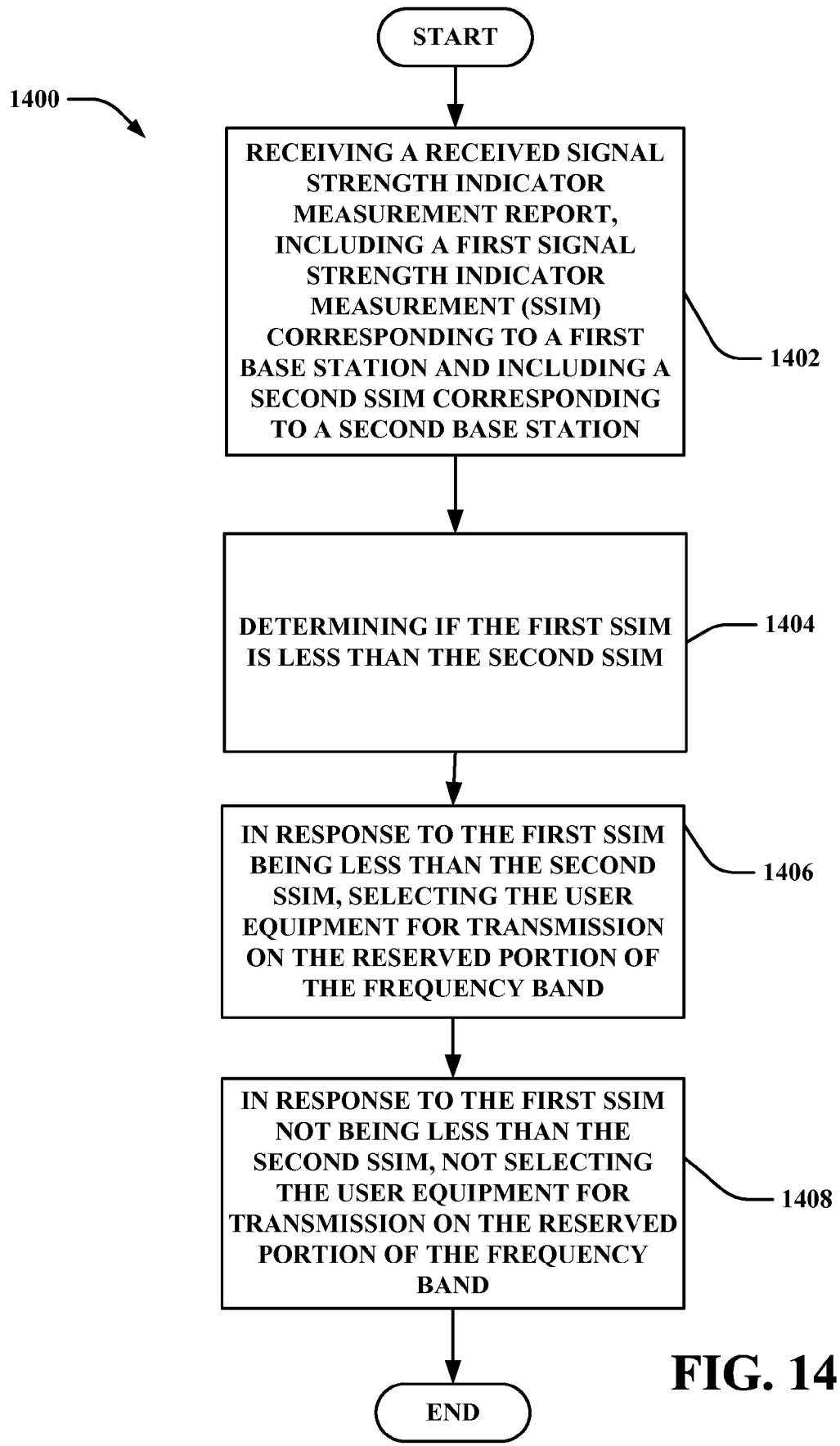

Referring to FIG. 13, the method 1300 can be for selecting a UE for scheduling of transmission of information on the frequencies corresponding to the reserved portion of frequency.

At 1302, the method 1300 can include receiving a channel measurement from the UE, and at 1304, determining if the channel measurement is below a selected level. At 1306, the method 1300 can include, in response to the channel measurement being below the selected level, selecting the UE for transmission of the information on the frequencies corresponding to the reserved portion. The information for transmission on the frequencies corresponding to the reserved portion can be signalling information, including, but not limited to, handover signalling information.

At 1308, the method 1300 can include, in response to the channel measurement not being below the selected level, not selecting the UE for transmission of the information on the frequencies corresponding to the reserved portion. The method 1300 can also include determining a plurality of channel measurements for other UEs. The method 1300 can also include determining if any of the plurality of channel measurements is below the selected level. The channel measurements can include, but are not limited to, CQI, SNR, signal-to-interference ratio (SIR), transmit powers from BSs, a received signal strength, a RSRP, a RSRQ, RSSI, measured pathloss, UL power headroom report (PHR) and/or UL interference-over-thermal (IoT) measurements.

The method 1300 can include, in response to none of the channel measurements being below the selected level, and therefore not selecting a UE for transmission of information on the frequencies corresponding to the reserved portion based on low channel measurements, selecting one or more UEs for transmission of data, in lieu of signalling information, on the frequencies corresponding to the reserved portion.

Now turning to FIG. 14, the method 1400 can include receiving a measurement report from the UE. In some embodiments, the measurement report can be a Radio Resource Management (RRM) measurement report. The RRM measurement report can include signal strength indicator measurements (SSIM). In one embodiment shown, at 1402, the method 1400 can include receiving an SSIM report. In various embodiments, the RRM measurement report can include, but is not limited to, RSRP or RSRQ for a number of BSs. At 1404, the method 1400 can include determining if the SSIM for a first BS is less than the SSIM for a second BS by more than an appropriately selected threshold. The first BS can be the source BS for the UE and the second BS can be a potential target BS for the UE.

At 1406, in response to the SSIM for the first BS being less than the SSIM for the second BS, the method 1400 can include selecting the UE for transmission of information on the frequencies corresponding to the first reserved portion. The information can be signalling information, for handover.

At 1408, in response to the SSIM for the first BS not being less than the SSIM for the second BS, the method 1400 can include not selecting the UE for transmission of information on the frequencies corresponding to the reserved portion. In this embodiment, any one or more UEs can be scheduled for transmission of data on the unreserved portion since the SSIM information indicates that the UE is close enough to the serving BS and therefore not likely to need handover support.

Figure 15:
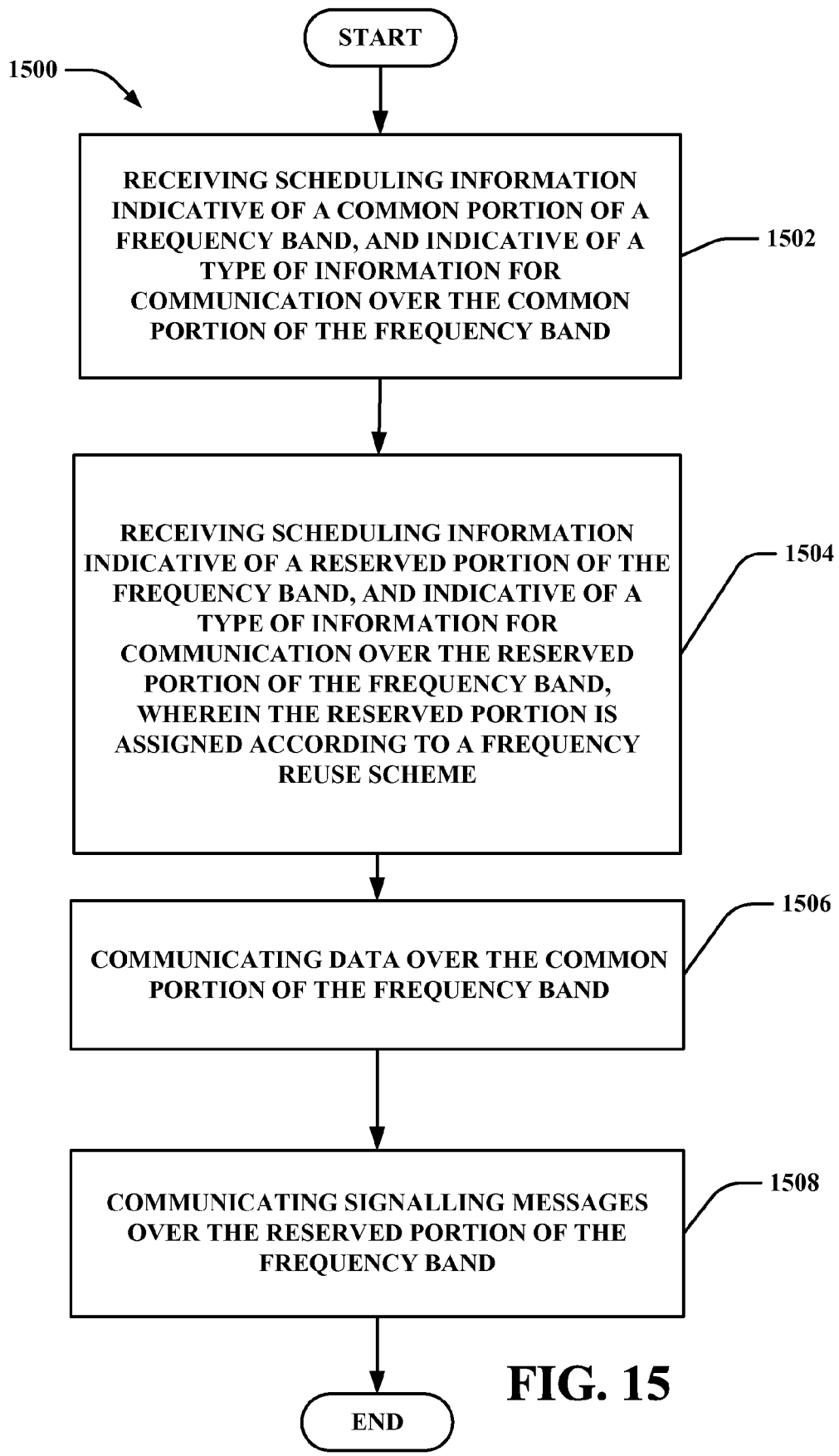
FIG. 15 is a flowchart illustrating a method for facilitating handover control using resource reservation with frequency reuse in accordance with aspects described herein.

FIG. 15 is another method for facilitating handover control using resource reservation with frequency reuse in accordance with aspects set forth herein. The method 1500 can include employing a processor for performing various acts. At 1502, the method 1500 can receive scheduling information indicative of frequencies corresponding to a common portion of a frequency band, and indicative of a type of first information for communication over the frequencies corresponding to the common portion of the frequency band. At 1504, the method 1500 can receive scheduling information indicative of reserved frequencies corresponding to a reserved portion of the frequency band, and indicative of a type of information for communication over the reserved frequencies. The reserved frequencies can be assigned to a BS according to a frequency reuse scheme employed over the reserved frequencies.

At 1506, the method 1500 can include communicating data over the frequencies corresponding to the common portion of the frequency band.

At 1508, the method 1500 can include communicating signalling messages over the reserved frequencies corresponding to the reserved portion of the frequency band. In some embodiments, the signalling message can be a message for handover, of a UE, from the serving BS for the UE to a target BS for the UE.

In some embodiments, at least one of the reserved frequencies corresponding to the reserved portion of the frequency band can correspond to a first random access channel. The frequencies corresponding to a common portion of a frequency band can correspond to a second random access channel. The first random access channel and the second random access channel can be accessible by the UE. Although not shown, the method 1500 can also include, measuring, at the UE, a channel quality experienced by the UE; and determining, at the UE, that the first random access channel corresponds to at least one of the reserved frequencies. Further, the method 1500 can include, in response to determining that the first random access channel corresponds to at least one of the reserved frequencies, and that the UE has poor channel quality that warrants use of the reserved frequencies, the UE communicating over the first random access channel in lieu of communicating over the second random access channel.

In various embodiments, computer program products having computer-readable mediums including code can be utilized to perform the method steps and/or functions described herein.

One embodiment includes a computer program product having a computer-readable medium storing a first set of codes for causing a computer to transmit scheduling information for transmission of information on frequencies corresponding to an unreserved portion of a frequency band. The computer-readable medium can also store a second set of codes for causing the computer to transmit scheduling information for transmission of other information on one or more frequencies corresponding to a reserved portion of the frequency band. The frequency reuse scheme can be employed over the one or more frequencies corresponding to the reserved portion of the frequency band.

In some embodiments, the information scheduled for transmission on the reserved portion of the frequency band can be signalling information including one or more messages for handover of a UE from a serving BS to a target BS. The frequency reuse scheme can include an assignment of the serving BS and target BS to frequencies corresponding to a reserved portion of the frequency band when the serving BS and the target BS are not neighboring BSs.

In some embodiments, the frequency reuse scheme can include an assignment of the serving BS to a first reserved portion of the frequency band, and the target BS to a second reserved portion of the frequency band when the serving BS and the target BS are neighboring BSs.

In some embodiments, the computer-readable medium also includes a third set of codes for causing the computer to select a first UE for transmission of the information on the one or more frequencies corresponding to the unreserved portion of the frequency band; and a fourth set of codes for causing the computer to select a second UE for transmission of information on the one or more frequencies corresponding to the reserved portion.

In some embodiments, the fourth set of codes for causing the computer to select the second UE for transmission of the information on the one or more frequencies corresponding to the reserved portion can include: a fifth set of codes for causing the computer to receive a channel measurement from the second UE; a sixth set of codes for causing the computer to determine if the channel measurement is below a selected level; a seventh set of codes for causing the computer to, in response to the channel measurement being below the selected level, select the second UE for transmission of information on the one or more frequencies corresponding to the reserved portion; and an eighth set of codes for causing the computer to, in response to the channel measurement not being below the selected level, not select the second UE for transmission of information on the one or more frequencies corresponding to the reserved portion.

In some embodiments, the computer program product also includes a ninth set of codes for causing the computer to determine a plurality of channel measurements for other UEs in the system; and a tenth set of codes for causing the computer to determine if any of the plurality of channel measurements from any of the UEs are below the selected level. The computer program product can also include an eleventh set of codes for causing the computer to, in response to none of the plurality of channel measurements for any of the UEs in the system being below the selected level, and not selecting the second UE for transmission of information on the one or more frequencies corresponding to the reserved portion, select at least one of the UEs for transmission of information on one or more frequencies corresponding to the reserved portion.

In some embodiments, the channel measurement can be at least one of: a channel quality indicator, a transmit power or a received signal strength measurement measured at the second UE. The plurality of channel measurements can be a plurality of channel quality indicators, transmit powers and/or received signal strength measurements from one or more of the other UEs besides the second UE.

Another embodiment includes a computer program product having a computer-readable medium. The computer-readable medium can include: a first set of codes for causing the computer to receive, at a UE, scheduling information indicative of one or more frequencies corresponding to a common portion of a frequency band, and indicative of a type of first information for communication over the one or more frequencies corresponding to the common portion of the frequency band. The computer-readable medium can also include: a second set of codes for causing the computer to receive, at the UE, scheduling information indicative of one or more reserved frequencies corresponding to a reserved portion of the frequency band, and indicative of a type of information for communication over the one or more reserved frequencies. The one or more reserved frequencies can be assigned to a BS according to a frequency reuse scheme employed over the one or more reserved frequencies.

In some embodiments, the computer program product can also include: a third set of codes for causing the computer to communicate, from the UE, data over the one or more frequencies corresponding to the common portion of the frequency band; and a fourth set of codes for causing the computer to communicate, from the UE, one or more signalling messages over the one or more reserved frequencies corresponding to the reserved portion of the frequency band.

In some embodiments, at least one of the one or more reserved frequencies corresponding to the reserved portion of the frequency band can correspond to a first random access channel, and at least one of the one or more frequencies corresponding to a common portion of a frequency band can correspond to a second random access channel. The first random access channel and the second random access channel can be accessible by the UE, and the computer program product can also include: a fifth set of codes for causing the computer to measure, at the UE, a channel quality experienced by the UE; a sixth set of codes for causing the computer to determine, at the UE, that the first random access channel corresponds to at least one of the one or more reserved frequencies; and a seventh set of codes for causing the computer to, in response to determining that the first random access channel corresponds to at least one of the one or more reserved frequencies, communicate over the first random access channel when the channel quality is less than a selected level.

Another embodiment includes another computer program product including a computer-readable medium. The computer-readable medium can include a first set of codes for causing a computer to receive information indicative of a frequency reuse scheme to be employed over a reserved portion of a frequency band assigned to a BS. The reserved portion of the frequency band can be a fraction of a frequency spectrum. The fraction of the frequency spectrum can be determined based on a signalling traffic load for the first BS and a position of the first BS relative to one or more other BSs. The computer program product can also include a second set of codes for causing the computer to transmit signalling information over the reserved portion of the frequency band.

Another embodiment includes another computer program product including a computer-readable medium. The computer-readable medium can include a first set of codes for causing the computer to identify a pair of BSs in a system; a second set of codes for causing the computer to determine if the pair of BSs are neighboring; a third set of codes for causing the computer to assign the first BS of the pair and the second BS of the pair to the same reserved subset of frequencies; and a fourth set of codes for causing the computer to, in response to the first BS and the second BS being neighboring base stations, assign full power transmission to the first BS and reduced power transmission to the second BS.

Another embodiment includes another computer program product including a computer-readable medium. The computer-readable medium can include a first set of codes for causing a computer to identify a pair of BSs in a system; a second set of codes for causing the computer to determine if the pair of BSs are neighboring base stations; a third set of codes for causing the computer to assign the first BS of the pair and the second BS of the pair to the same reserved subset of frequencies; and a fourth set of codes for causing the computer to, in response to the pair of BSs being neighboring base stations, assign a first power level to the first BS of the pair and a second power level to the second BS of the pair. The first power level and the second power level can be different and can be assigned for concurrent transmissions from the first BS and the second BS.

Another embodiment includes a computer program product including a computer-readable medium. The computer-readable medium can include a first set of codes for causing the computer to identify a pair of BSs; a second set of codes for causing the computer to determine if the pair of BSs are neighboring BSs; a third set of codes for causing the computer to, in response to the pair being neighboring base stations, assign the first BS of the pair to a first reserved subset of frequencies, and assigning the second BS of the pair to a second reserved subset of frequencies; and a fourth set of codes for causing the computer to, in response to the first BS and the second BS not being neighboring base stations, assign the first BS and the second BS to the same reserved subset of frequencies.

Another embodiment includes another computer program product including another computer-readable medium. The computer program product can include: a first set of codes for causing a first computer to determine a signalling traffic load in a cell managed by a first base station; and a second set of codes for causing the first computer to determine a fraction of a frequency spectrum for allocation to the first base station. The determination of the fraction of the frequency spectrum can be made based on the signalling traffic load and a position of the first base station relative to other base stations, and the fraction of the frequency spectrum can correspond to a reserved portion of frequency. The computer program product can also include: a third set of codes for causing the first computer to determine a frequency reuse scheme to employ over the reserved portion of frequency; a fourth set of codes for causing the first computer to transmit information indicative of the frequency reuse scheme to the first base station; a fifth set of codes for causing a second computer to measure channel conditions; and a sixth set of codes for causing the second computer to output information indicative of channel conditions. The computer program product can also include: a seventh set of codes for causing a third computer to receive the information indicative of the frequency reuse scheme; an eighth set of codes for causing the third computer to receive the information indicative of channel conditions; and a ninth set of codes for causing the third computer to schedule communication for the second computer on the reserved portion of frequency, in response to the channel conditions being below a selected level. The scheduled communication can be handover signalling communication.

Figure 16:
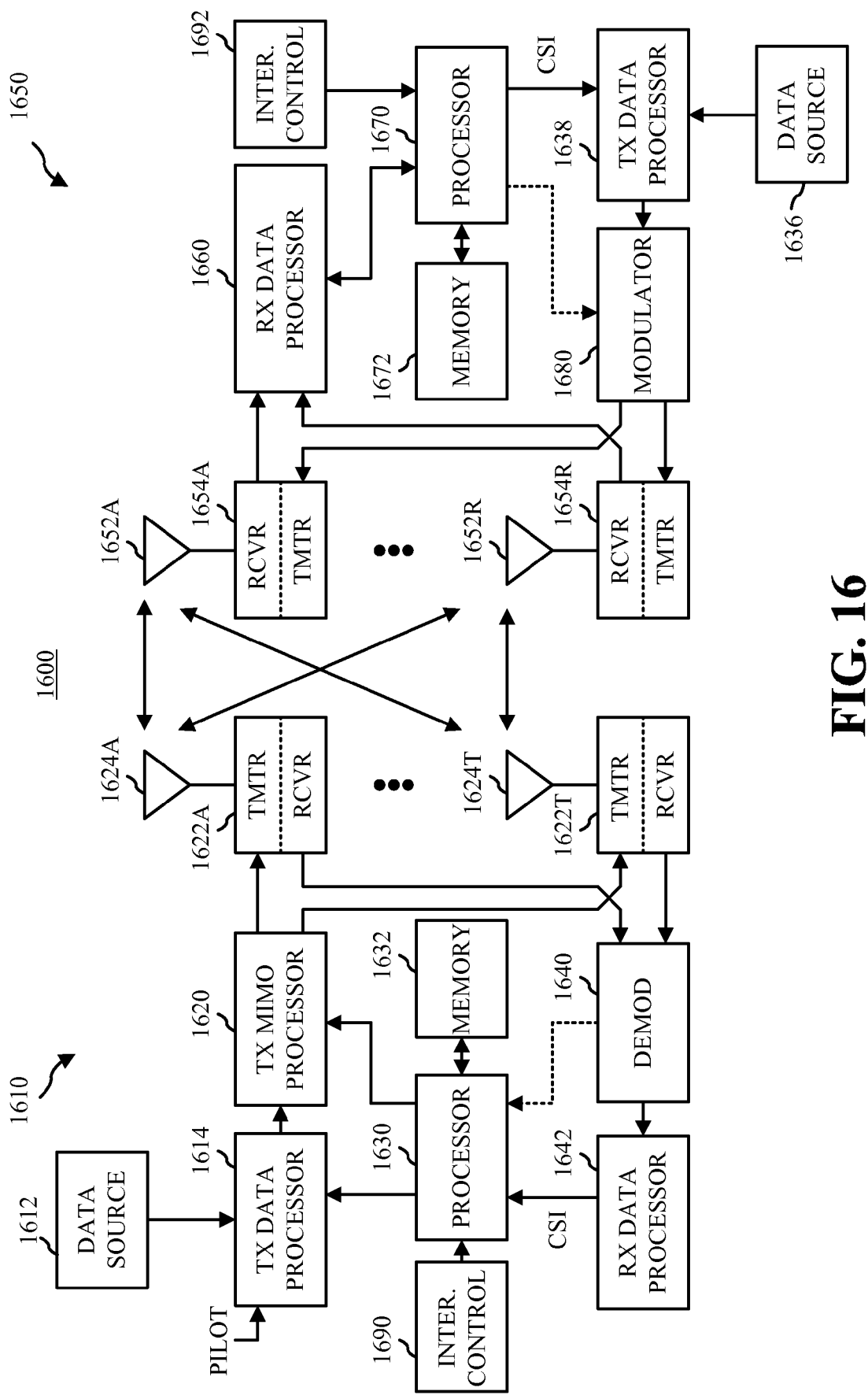
FIG. 16 is an illustration of an example system for facilitating handover control using resource reservation with frequency reuse in accordance with aspects described herein.

FIG. 16 is an illustration of an example system for facilitating handover control using resource reservation with frequency reuse in accordance with aspects described herein. Referring now to FIG. 16, a block diagram illustrating an example system 1600 in which various aspects described herein can function is provided. In one example, system 1600 is a multiple-input multiple-output (MIMO) system that includes a transmitter system 1610 and a receiver system 1650. It should be appreciated, however, that transmitter system 1610 and/or receiver system 1650 could also be applied to a multi-input single-output system wherein, for example, multiple transmit antennas (e.g., on a base station), can transmit one or more symbol streams to a single antenna device (e.g., a mobile station). Additionally, it should be appreciated that aspects of transmitter system 1610 and/or receiver system 1650 described herein could be utilized in connection with a single output to single input antenna system.

In accordance with one aspect, traffic data for a number of data streams are provided at transmitter system 1610 from a data source 1612 to a transmit (TX) data processor 1614. In one example, each data stream can then be transmitted via a respective transmit antenna 1624. Additionally, TX data processor 1614 can format, encode, and interleave traffic data for each data stream based on a particular coding scheme selected for each respective data stream in order to provide coded data. In one example, the coded data for each data stream can then be multiplexed with pilot data using OFDM techniques. The pilot data can be, for example, a known data pattern that is processed in a known manner. Further, the pilot data can be used at receiver system 1650 to estimate channel response. Back at transmitter system 1610, the multiplexed pilot and coded data for each data stream can be modulated (i.e., symbol mapped) based on a particular modulation scheme (e.g., BPSK, QSPK, M-PSK, or M-QAM) selected for each respective data stream in order to provide modulation symbols. In one example, data rate, coding, and modulation for each data stream can be determined by instructions performed on and/or provided by processor 1630.

Next, modulation symbols for all data streams can be provided to a TX MIMO processor 1620, which can further process the modulation symbols (e.g., for OFDM). TX MIMO processor 1620 can then provides $N_T$ modulation symbol streams to $N_T$ transceivers 1622A through 1622T. In one example, each transceiver 1622 can receive and process a respective symbol stream to provide one or more analog signals. Each transceiver 1622 can then further condition (e.g., amplify, filter, and upconvert) the analog signals to provide a modulated signal suitable for transmission over a MIMO channel. Accordingly, $N_T$ modulated signals from transceivers 1622A through 1622T can then be transmitted from $N_T$ antennas 1624A through 1624T, respectively.

In accordance with another aspect, the transmitted modulated signals can be received at receiver system 1650 by $N_R$ antennas 1652A through 1652R. The received signal from each antenna 1652 can then be provided to respective transceivers 1654. In one example, each transceiver 1654 can condition (e.g., filter, amplify, and downconvert) a respective received signal, digitize the conditioned signal to provide samples, and then processes the samples to provide a corresponding "received" symbol stream. An RX data processor 1660 can then receive and process the $N_R$ received symbol streams from $N_R$ transceivers 1654 based on a particular receiver processing technique to provide $N_T$ "detected" symbol streams. In some embodiments, the RX data processor 1660 can be an RX MIMO data processor. In one example, each detected symbol stream can include symbols that are estimates of the modulation symbols transmitted for the corresponding data stream. RX data processor 1660 can then process each symbol stream at least in part by demodulating, deinterleaving, and decoding each detected symbol stream to recover traffic data for a corresponding data stream. Thus, the processing by RX data processor 1660 can be complementary to that performed by TX MIMO processor 1620 and TX data processor 1614 at transmitter system 1610. RX data processor 1660 can additionally provide processed symbol streams to a data sink (not shown).

In accordance with one aspect, the channel response estimate generated by RX data processor 1660 can be used to perform space/time processing at the receiver, adjust power levels, change modulation rates or schemes, and/or other appropriate actions. Additionally, RX data processor 1660 can further estimate channel characteristics such as, for example, signal-to-noise-and-interference ratios (SNRs) of the detected symbol streams. RX data processor 1660 can then provide estimated channel characteristics to a processor 1670. In one example, RX data processor 1660 and/or processor 1670 can further derive an estimate of the "operating" SNR for the system. Processor 1670 can then provide channel state information (CSI), which can comprise information regarding the communication link and/or the received data stream. This information can include, for example, the operating SNR. The CSI can then be processed by a TX data processor 1638, modulated by a modulator 1680, conditioned by transceivers 1654A through 1654R, and transmitted back to transmitter system 1610. In addition, a data source 1636 at receiver system 1650 can provide additional data to be processed by TX data processor 1638.

Back at transmitter system 1610, the modulated signals from receiver system 1650 can then be received by antennas 1624, conditioned by transceivers 1622, demodulated by a demodulator 1640, and processed by a RX data processor 1642 to recover the CSI reported by receiver system 1650. In one example, the reported CSI can then be provided to processor 1630 and used to determine data rates as well as coding and modulation schemes to be used for one or more data streams. The determined coding and modulation schemes can then be provided to transceivers 1622 for quantization and/or use in later transmissions to receiver system 1650. Additionally and/or alternatively, the reported CSI can be used by processor 1630 to generate various controls for TX data processor 1614 and TX MIMO processor 1620. In another example, CSI and/or other information processed by RX data processor 1642 can be provided to a data sink (not shown).

In one example, processor 1630 at transmitter system 1610 and processor 1670 at receiver system 1650 direct operation at their respective systems. Additionally, a database (not shown) at transmitter system 1610 and a database (not shown) at receiver system 1650 can provide storage for program codes and data used by processors 1630 and 1670, respectively. Further, at receiver system 1650, various processing techniques can be used to process the $N_R$ received signals to detect the $N_T$ transmitted symbol streams. These receiver processing techniques can include spatial and space-time receiver processing techniques, which can also be referred to as equalization techniques, and/or "successive nulling/equalization and interference cancellation" receiver processing techniques, which can also be referred to as "successive interference cancellation" or "successive cancellation" receiver processing techniques.

The teachings herein may be incorporated into a node (e.g., a device) employing various components for communicating with at least one other node. FIG. 16 depicts several sample components that may be employed to facilitate communication between nodes. Specifically, FIG. 16 illustrates a wireless device (e.g., an access point) and a wireless device 1650 (e.g., a UE) of a MIMO system 1600. At the device 1610, traffic data for a number of data streams is provided from a data source 1612 to a transmit ("TX") data processor 1614.

In some aspects, each data stream is transmitted over a respective transmit antenna. The TX data processor 1614 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1630. A data memory 1632 may store program code, data, and other information used by the processor 1630 or other components of the device 1610.

The modulation symbols for all data streams are then provided to a TX MIMO processor 1620, which may further process the modulation symbols (e.g., for OFDM). The TX MIMO processor 1620 then provides $N_T$ modulation symbol streams to $N_T$ transceivers ("XCVR") 1622A through 1622T. In some aspects, the TX MIMO processor 1620 applies beamforming weights to the symbols of the data streams and to the antenna from which the symbol is being transmitted.

Each transceiver 1622 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1622A through 1622T are then transmitted from $N_T$ antennas 1624A through 1624T, respectively.

At the device 1650, the transmitted modulated signals are received by $N_R$ antennas 1652A through 1652R and the received signal from each antenna 1652 is provided to a respective transceiver ("XCVR") 1654A through 1654R. Each transceiver 1654 conditions (e.g., filters, amplifies, and downconverts) a respective received signal, digitizes the conditioned signal to provide samples, and further processes the samples to provide a corresponding "received" symbol stream.

An RX data processor 1660 then receives and processes the $N_R$ received symbol streams from $N_R$ transceivers 1654 based on a particular receiver processing technique to provide $N_T$ "detected" symbol streams. The RX data processor 1660 then demodulates, deinterleaves, and decodes each detected symbol stream to recover the traffic data for the data stream. The processing by the RX data processor 1660 is complementary to that performed by the TX MIMO processor 1620 and the TX data processor 1614 at the device 1610.

A processor 1670 periodically determines which pre-coding matrix to use (discussed below). The processor 1670 formulates a reverse link message comprising a matrix index portion and a rank value portion. A data memory 1672 can store program code, data, and other information used by the processor 1670 or other components of the device 1650.

The reverse link message may comprise various types of information regarding the communication link and/or the received data stream. The reverse link message is then processed by a TX data processor 1638, which also receives traffic data for a number of data streams from a data source 1636, modulated by a modulator 1680, conditioned by the transceivers 1654A through 1654R, and transmitted back to the device 1610.

At the device 1610, the modulated signals from the device 1650 are received by the antennas 1624, conditioned by the transceivers 1622, demodulated by a demodulator ("DEMOD") 1640, and processed by a RX data processor 1642 to extract the reverse link message transmitted by the device 1650. The processor 1630 then determines which pre-coding matrix to use for determining the beam-forming weights then processes the extracted message.

In some embodiments, there is a unique RB associated with one or more of the $N_T$ antennas 1624A through 1624T. Accordingly, the methods described herein for frequency resource reservation on the downlink can be employed for one or more of the $N_T$ antennas 1624A through 1624T and for one or more corresponding $N_R$ antennas 1652A through 1652R.

In some embodiments, the methods described herein for frequency resource reservation on the uplink can be employed between one or more $N_R$ antennas 1652A through 1652R and one or more $N_T$ antennas 1624A through 1624T. Accordingly, when a device 1650 accesses a channel using random access, it can attempt the random access on only a subset of frequencies.

FIG. 16 also illustrates that the communication components may include one or more components that perform interference control operations as taught herein. For example, an interference ("INTER.") control component 1690 can cooperate with the processor 1630 and/or other components of the device 1610 to send/receive signals to/from another device (e.g., device 1650) as taught herein. Similarly, an interference control component 1692 may cooperate with the processor 1670 and/or other components of the device 1650 to send/receive signals to/from another device (e.g., device 1610). It should be appreciated that for each device 1610 and 1650 the functionality of two or more of the described components may be provided by a single component. For example, a single processing component may provide the functionality of the interference control component 1690 and the processor 1630 and a single processing component may provide the functionality of the interference control component 1692 and the processor 1670.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM database, flash database, ROM database, EPROM database, EEPROM database, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine-readable medium and/or computer readable medium, which may be incorporated into a computer program product.

In one or more exemplary embodiments, the methods and functions described may be implemented in hardware, software, firmware, or any combination thereof. If implemented in software, the methods and functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method, comprising:
    transmitting scheduling information for transmission of first information on one or more frequencies corresponding to an unreserved portion of a frequency band; and
    transmitting scheduling information for transmission of second information on one or more frequencies corresponding to a first reserved portion of the frequency band, wherein the first reserved portion is assigned to a first base station of a plurality of base stations, and a frequency reuse scheme is employed over the one or more frequencies corresponding to the first reserved portion of the frequency band.

2. The method of claim 1, wherein the second information is signalling information comprising one or more messages for handover, of first user equipment among a plurality of user equipment, the handover being from the first one of the plurality of base stations to a second one of the plurality of base stations.

3. The method of claim 2, wherein the frequency reuse scheme comprises an assignment of the first one of the plurality of base stations and a third one of the plurality of base stations to the one or more frequencies corresponding to the first reserved portion of the frequency band, wherein the first one of the plurality of base stations is a non-neighboring base station relative to the third one of the plurality of base stations.

4. The method of claim 2, wherein the frequency reuse scheme comprises an assignment of the first one of the plurality of base stations to the first reserved portion of the frequency band, and an assignment of the second one of the plurality of base stations to a second reserved portion of the frequency band, wherein the first one of the plurality of base stations and the second one of the plurality of base stations are neighboring base stations.

5. The method of claim 1, further comprising:
selecting a first one of a plurality of user equipment for transmission of the first information on the one or more frequencies corresponding to the unreserved portion of the frequency band; and
selecting a second one of the plurality of user equipment for transmission of the second information on the one or more frequencies corresponding to the first reserved portion.

6. The method of claim 5, wherein selecting the second one of the plurality of user equipment comprises:
receiving a channel measurement from the second one of the plurality of user equipment;
determining if the channel measurement is below a selected level;
in response to the channel measurement being below the selected level, selecting the second one of the plurality of user equipment for transmission of the second information on the one or more frequencies corresponding to the first reserved portion; and
in response to the channel measurement not being below the selected level, not selecting the second one of the plurality of user equipment for transmission of the second information on the one or more frequencies corresponding to the first reserved portion.

7. The method of claim 6, further comprising:
determining a plurality of channel measurements for other ones of the plurality of user equipment;
determining if any of the plurality of channel measurements are below the selected level; and
in response to none of the plurality of channel measurements being below the selected level, and not selecting the second one of the plurality of user equipment for transmission of the second information on the one or more frequencies corresponding to the first reserved portion, selecting at least one of the plurality of user equipment for transmission of the first information on the one or more frequencies corresponding to the first reserved portion.

8. The method of claim 7, wherein the channel measurement is at least one of: a channel quality indicator, a transmit power or a received signal strength measurement measured at the second one of the plurality of user equipment,
and wherein the plurality of channel measurements is a plurality of channel quality indicators from other ones of the plurality of user equipment when the channel measurement is a channel quality indicator,
and wherein the plurality of channel measurements is a plurality of transmit powers measured at other ones of the plurality of user equipment when the channel measurement is a transmit power, and wherein the plurality of channel measurements is a plurality of received signal strength measurements when the channel measurement is a received signal strength measurement.

9. The method of claim 8, wherein the first information is data and the second information is signalling information.

10. The method of claim 5, wherein selecting the second one of the plurality of user equipment comprises:
receiving a received signal strength measurement report from the second one of the plurality of user equipment, wherein the received signal strength measurement report comprises a first signal strength indicator measurement for the first one of the plurality of base stations and a second signal strength indicator measurement for a second one of the plurality of base stations;
determining if the first signal strength indicator measurement for the first one of the plurality of base stations is less than the second signal strength indicator measurement for the second one of the plurality of base stations;
in response to the first signal strength indicator measurement for the first one of the plurality of base stations being less than the second signal strength indicator measurement for the second one of the plurality of base stations, selecting the second one of the plurality of user equipment for transmission of the second information on the one or more frequencies corresponding to the first reserved portion; and
in response to the first signal strength indicator measurement for the first one of the plurality of base stations not being less than the second signal strength indicator measurement for the second one of the plurality of base stations, not selecting the second one of the plurality of user equipment for transmission of the second information on the one or more frequencies corresponding to the first reserved portion.

11. The method of claim 1, further comprising transmitting scheduling information indicative of a time slot for transmission of the first information or the second information.

12. A computer program product, comprising:
a non-transitory computer-readable medium having stored thereon instructions adapted to cause a computing device to execute operations comprising:
transmitting, using at least one transmitter coupled to the computing device, scheduling information for transmission of first information on one or more frequencies corresponding to an unreserved portion of a frequency band; and
transmitting, using the at least one transmitter, scheduling information for transmission of second information on one or more frequencies corresponding to a first reserved portion of the frequency band, wherein a frequency reuse scheme is employed over the one or more frequencies corresponding to the first reserved portion of the frequency band.

13. The computer program product of claim 12, wherein the second information is signalling information comprising one or more messages for handover of first user equipment among a plurality of user equipment, wherein the handover is from the first one of a plurality of base stations to a second one of the plurality of base stations.

14. The computer program product of claim 13, wherein the frequency reuse scheme comprises an assignment of the first one of the plurality of base stations and a third one of the plurality of base stations to the one or more frequencies corresponding to the first reserved portion of the frequency band, wherein the first one of the plurality of base stations is a non-neighboring base station relative to the third one of the plurality of base stations.

15. The computer program product of claim 13, wherein the frequency reuse scheme comprises an assignment of the first one of the plurality of base stations to the first reserved portion of the frequency band, and the second one of the plurality of base stations to a second first reserved portion of the frequency band, wherein the first one of the plurality of base stations and the second one of the plurality of base stations are neighboring base stations.

16. The computer program product of claim 12, the operations further comprising:
selecting a first one of a plurality of user equipment for transmission of the first information on the one or more frequencies corresponding to the unreserved portion of the frequency band; and
selecting a second one of the plurality of user equipment for transmission of the second information on the one or more frequencies corresponding to the first reserved portion.

17. The computer program product of claim 16, wherein the selecting the second one of the plurality of user equipment comprises:
receiving, using at least one receiver coupled to the computing device, a channel measurement from the second one of the plurality of user equipment;
determining if the channel measurement is below a selected level;
in response to the channel measurement being below the selected level, selecting the second one of the plurality of user equipment for transmission of the second information on the one or more frequencies corresponding to the first reserved portion; and
in response to the channel measurement not being below the selected level, not selecting the second one of the plurality of user equipment for transmission of the second information on the one or more frequencies corresponding to the first reserved portion.

18. The computer program product of claim 17, the operations further comprising:
determining a plurality of channel measurements for other ones of the plurality of user equipment;
determining if any of the plurality of channel measurements are below the selected level; and
in response to none of the plurality of channel measurements being below the selected level, and not selecting the second one of the plurality of user equipment for transmission of the second information on the one or more frequencies corresponding to the first reserved portion, selecting at least one of the plurality of user equipment for transmission of the first information on the one or more frequencies corresponding to the first reserved portion.

19. The computer program product of claim 18, wherein the channel measurement is at least one of: a channel quality indicator, a transmit power or a received signal strength measurement measured at the second one of the plurality of user equipment,
and wherein the plurality of channel measurements is a plurality of channel quality indicators from other ones of the plurality of user equipment when the channel measurement is a channel quality indicator,
and wherein the plurality of channel measurements is a plurality of transmit powers measured at other ones of the plurality of user equipment when the channel measurement is a transmit power,
and wherein the plurality of channel measurements is a plurality of received signal strength measurements when the channel measurement is a received signal strength measurement.

20. The computer program product of claim 19, wherein the first information is data and the second information is signalling information.

21. An apparatus, comprising:
a receiver configured to:
receive frequency reuse information indicative of a first reserved portion of a frequency band assigned to the apparatus according to a frequency reuse scheme; and
receive information indicative of a quality of a channel experienced at a user equipment;
a control unit comprising:
a channel quality unit configured to determine the quality of the channel experienced at the user equipment; and
a scheduling unit configured to schedule communication of first information on the first reserved portion of the frequency band in response to the quality of the channel at the user equipment being less than a selected level, wherein the first information is signalling information;
a transmitter configured to transmit, to the user equipment, resource allocation information indicative of a scheduled communication; and
a memory configured to store received frequency reuse information.

22. The apparatus of claim 21, wherein the apparatus is a first base station, and the control unit further comprises a base station data and signalling information generator configured to generate data for transmission on an unreserved portion of the frequency band and to generate signalling information for transmission on the first reserved portion of the frequency band.

23. The apparatus of claim 22, wherein the signalling information is handover signalling information.

24. The apparatus of claim 22, wherein the frequency reuse scheme comprises an assignment of the first base station to the first reserved portion of frequency and an assignment of a second base station to a second reserved portion of frequency, the first base station and the second base station being neighboring base stations relative to one another.

25. The apparatus of claim 24, wherein the control unit further comprises a power control unit configured to control a power level of information transmitted from the first base station, the power level being determined according to the frequency reuse scheme.

26. The apparatus of claim 21, wherein the scheduling unit is further configured to:
not schedule communication of the first information on the first reserved portion of the frequency band in response to the quality of the channel at the user equipment not being less than a selected level.

27. An apparatus, comprising:
means for transmitting scheduling information for transmission of first information on one or more frequencies corresponding to an unreserved portion of a frequency band; and
means for transmitting scheduling information for transmission of second information on one or more frequencies corresponding to a first reserved portion of the frequency band, wherein the first reserved portion is assigned to a first base station of a plurality of base stations, and a frequency reuse scheme is employed over the one or more frequencies corresponding to the first reserved portion of the frequency band.

28. The apparatus of claim 27, wherein the second information is signalling information comprising one or more messages for handover, of first user equipment among a plurality of user equipment, the handover being from the first one of the plurality of base stations to a second one of the plurality of base stations.

29. The apparatus of claim 28, wherein the frequency reuse scheme comprises an assignment of the first one of the plurality of base stations and a third one of the plurality of base stations to the one or more frequencies corresponding to the first reserved portion of the frequency band, wherein the first one of the plurality of base stations is a non-neighboring base station relative to the third one of the plurality of base stations.

\* \* \* \* \*